United States Patent
Yamada et al.

(10) Patent No.: US 9,593,468 B2
(45) Date of Patent: Mar. 14, 2017

(54) WORK VEHICLE AND WORK VEHICLE CONTROL METHOD

(71) Applicant: KOMATSU LTD., Tokyo (JP)

(72) Inventors: Kenichi Yamada, Fujisawa (JP); Shunsuke Miyamoto, Atsugi (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/892,703

(22) PCT Filed: Dec. 17, 2014

(86) PCT No.: PCT/JP2014/083411
§ 371 (c)(1),
(2) Date: Nov. 20, 2015

(87) PCT Pub. No.: WO2015/107829
PCT Pub. Date: Jul. 23, 2015

(65) Prior Publication Data
US 2016/0097186 A1    Apr. 7, 2016

(30) Foreign Application Priority Data

Jan. 15, 2014  (JP) ................................. 2014-005028

(51) Int. Cl.
*G06F 7/70* (2006.01)
*E02F 9/22* (2006.01)
(Continued)

(52) U.S. Cl.
CPC .............. *E02F 9/2246* (2013.01); *B60K 6/28* (2013.01); *B60K 6/365* (2013.01); *B60K 6/387* (2013.01);
(Continued)

(58) Field of Classification Search
CPC ..... E02F 9/2246; E02F 9/2079; E02F 9/2075; E02F 9/2066; B60W 10/30; B60W 20/10;
(Continued)

(56) References Cited

U.S. PATENT DOCUMENTS 6,319,170 B1 * 11/2001 Hubbard ........... B60W 30/1819
477/107
7,081,068 B2 * 7/2006 Nakagawa ............ B60W 10/06
477/132
(Continued)

FOREIGN PATENT DOCUMENTS

JP    2006-205777 A    1/2005
JP    2006-329244 A    7/2006
(Continued)

OTHER PUBLICATIONS

The International Search Report for the corresponding international application No. PCT/JP2014/083411, issued on Mar. 24, 2015.

*Primary Examiner* — Shardul Patel
(74) *Attorney, Agent, or Firm* — Global IP Counselors, LLP

(57) ABSTRACT

A work implement requirement determination unit of a work vehicle determines a work implement required power based on the operation amount of a work implement operating member and the work implement pump pressure. A transmission requirement determination unit determines a transmission required power based on the vehicle speed and the operation amount of the accelerator operating member. When the sum of the work implement required power and the transmission required power is greater than a first distributable power that a predetermined preferential distribution power subtracted from a load upper limit power of the engine leaves, a distribution ratio determination unit allocates the smaller of a transmission compensation power and the transmission required power to a power transmission (Continued)

device and distributes the remainder of the first distributable power to the work implement pump and to a power transmission device.

9 Claims, 17 Drawing Sheets

(51) Int. Cl.
| | |
|---|---|
| B60K 6/28 | (2007.10) |
| B60K 6/445 | (2007.10) |
| B60K 6/50 | (2007.10) |
| B60K 6/547 | (2007.10) |
| B60K 25/02 | (2006.01) |
| B60W 10/06 | (2006.01) |
| B60W 10/30 | (2006.01) |
| B60W 20/00 | (2016.01) |
| F02D 29/04 | (2006.01) |
| B60K 6/365 | (2007.10) |
| B60K 6/387 | (2007.10) |
| E02F 9/20 | (2006.01) |
| B60W 10/08 | (2006.01) |
| B60W 10/105 | (2012.01) |
| B60K 6/38 | (2007.10) |

(52) U.S. Cl.
CPC ............... *B60K 6/445* (2013.01); *B60K 6/50* (2013.01); *B60K 6/547* (2013.01); *B60K 25/02* (2013.01); *B60W 10/06* (2013.01); *B60W 10/08* (2013.01); *B60W 10/105* (2013.01); *B60W 10/30* (2013.01); *B60W 20/00* (2013.01); *B60W 20/10* (2013.01); *E02F 9/2066* (2013.01); *E02F 9/2075* (2013.01); *E02F 9/2079* (2013.01); *E02F 9/2253* (2013.01); *E02F 9/2289* (2013.01); *E02F 9/2292* (2013.01); *E02F 9/2296* (2013.01); *F02D 29/04* (2013.01); *B60K 2006/381* (2013.01); *B60W 2510/0638* (2013.01); *B60W 2510/0666* (2013.01); *B60W 2510/1035* (2013.01); *B60W 2510/244* (2013.01); *B60W 2510/305* (2013.01); *B60W 2520/12* (2013.01); *B60W 2540/10* (2013.01); *B60W 2540/16* (2013.01); *B60W 2710/0666* (2013.01); *B60W 2710/083* (2013.01); *B60W 2710/1005* (2013.01); *B60W 2710/105* (2013.01); *B60W 2710/1022* (2013.01); *B60W 2710/1061* (2013.01); *B60W 2710/305* (2013.01); *Y02T 10/6239* (2013.01); *Y10S 903/93* (2013.01)

(58) Field of Classification Search
CPC ... B60W 2510/305; B60W 2510/0638; B60W 2540/10; B60W 2710/1005; B60W 2710/0666; B60W 2510/244; B60W 2710/1022; B60W 2710/083; B60W 10/06; B60W 10/105; B60W 10/08; B60W 2510/0666; B60W 2520/12; B60W 2710/1061; B60W 2710/305; B60W 2510/1035; B60W 2540/16; B60W 2710/105
USPC ........ 701/50; 475/78, 149, 135, 151, 5, 286, 475/323; 320/109; 180/306; 165/281; 60/698
See application file for complete search history.

(56) References Cited

U.S. PATENT DOCUMENTS

| | | | | |
|---|---|---|---|---|
| 2009/0105028 A1* | 4/2009 | Hiraki | .................... | B60K 6/445 475/78 |
| 2011/0230296 A1* | 9/2011 | Hiraki | .................... | B60K 6/445 475/151 |
| 2012/0108378 A1* | 5/2012 | Hiraki | .................... | B60K 6/445 475/78 |
| 2013/0319786 A1* | 12/2013 | Kikuchi | ................ | E02F 9/0866 180/306 |
| 2014/0103874 A1* | 4/2014 | Ishida | ................ | B60L 11/1809 320/109 |

FOREIGN PATENT DOCUMENTS

| | | |
|---|---|---|
| JP | 2007-290607 A | 11/2007 |
| JP | 2013-147929 A | 8/2013 |
| WO | 2012/050133 A1 | 4/2012 |

* cited by examiner

WORK VEHICLE AND WORK VEHICLE CONTROL METHOD

CROSS-REFERENCE TO RELATED APPLICATIONS

This application is a U.S. National stage application of International Application No. PCT/JP2014/083411, filed on Dec. 17, 2014. This U.S. National stage application claims priority under 35 U.S.C. §119(a) to Japanese Patent Application No. 2014-005028, filed in Japan on Jan. 15, 2014, the entire contents of which are hereby incorporated herein by reference.

BACKGROUND

Field of the Invention

The present invention relates to a work vehicle and a work vehicle control method.

Background Information

A work vehicle, such as a wheel loader, which is provided with a power transmission device having a torque converter and a multi-stage transmission (the power transmission device is referred to hereinbelow as a "torque converter-type transmission") has become publicly known. Recently however, hydraulic-mechanical transmissions (HMT) have become known as power transmission devices in place of torque converter-type transmissions. As disclosed in Japanese Laid-Open Patent Publication No. 2006-329244, an HMT has a gear mechanism and a motor connected to rotation elements of the gear mechanism, and a portion of the driving power from the engine is converted to hydraulic pressure and transmitted to the travel device, and the remaining portion of the driving power is mechanically transmitted to the travelling apparatus.

The HMT is provided, for example, with a planetary gear mechanism and a hydraulic motor to allow continuous speed variation. The first element among the three elements of a sun gear, a carrier, and a ring gear of the planetary gear mechanism is coupled to an input shaft, and the second element is coupled to an output shaft. The third element is coupled to the hydraulic motor. The hydraulic motor functions as either a motor or a pump in accordance with the travel state of the work vehicle. The HMT is configured to enable stepless changing of the rotation speed of the output shaft by changing the rotation speed of the hydraulic motor.

An electric-mechanical transmission (EMT) has been proposed as a technique similar to the HMT. An electric motor is used in the EMT in place of the hydraulic motor in the HMT. The electric motor functions as either a motor or a generator in response to the travel state of the work vehicle. Similar to the HMT, the EMT is configured to enable stepless changing of the rotation speed of the output shaft by changing the rotation speed of the electric motor.

SUMMARY

A work vehicle provided with a transmission, such as an HMT or an EMT, is also provided with a work implement pump for controlling a work implement. Generally, a variable displacement hydraulic pump that can change the discharge capacity of hydraulic fluid is used as the work implement pump. When a stepless speed change transmission and a variable displacement work implement pump are used in a work vehicle as mentioned above, driving power from the engine can be freely divided into the power for travel of the vehicle, the power for driving the work implement and the driving power for driving the motor used for the travel of the vehicle.

Meanwhile, the driving power from the engine is distributed mechanically to a torque converter and the work implement pump in a conventional torque converter-type transmission. Since many operators are accustomed to operating vehicles with the conventional torque converter-type transmission (torque converter-type work vehicles), distributing the driving power from the engine to reproduce the same operating feeling as in a torque converter-type vehicle is important from the point of view of improving work efficiency.

An object of the present invention is to provide a work vehicle and a work vehicle control method that enable the distribution of driving power from the engine to driving power for the travel of the vehicle and driving power for the work implement to be able to reproduce the same operation feeling as that of a torque converter-type vehicle.

A work vehicle according to a first exemplary embodiment of the present invention is equipped with an engine, a work implement pump, a work implement, a travelling apparatus, a power transmission device, a vehicle speed detecting unit, a work implement pump pressure detecting unit, a work implement operating member, a work implement operation detecting unit, an accelerator operating member, an accelerator operation detecting unit, and a control unit. The work implement pump is driven by the engine. The work implement is driven by hydraulic fluid discharged from the work implement pump. The travelling apparatus is driven by the engine. The power transmission device includes at least an input shaft for inputting driving power from the engine, an output shaft for outputting driving power transmitted to the travelling apparatus, and a motor. The vehicle speed detecting unit detects the vehicle speed. The work implement pump pressure detecting unit detects the work implement pump pressure of the work implement pump. The work implement operating member is a member for operating the work implement. The work implement operation detecting unit detects an operation amount of the work implement operating member. The accelerator operation detecting unit detects an operation amount of the accelerator operating member. The control unit controls the power transmission device. The power transmission device is configured so that a rotation speed ratio of the output shaft with respect to the input shaft is changed by changing the rotation speed of the motor.

The control unit includes a work implement requirement determination unit, a transmission requirement determination unit, and a distribution ratio determination unit. The work implement requirement determination unit determines a work implement required power on the basis of an operation amount of the work implement operating member and the work implement pump pressure. The transmission requirement determination unit determines a transmission required power on the basis of the vehicle speed and the operation amount of the accelerator operating member. The distribution ratio determination unit determines a transmission output ratio that is a value derived by dividing the driving power actually supplied from the engine to the power transmission device by the transmission required power, and a work implement output ratio that is a value derived by dividing the driving power actually supplied from the engine to the work implement pump by the work implement required power. In a first case in which the engine rotates at a rotation speed equal to or greater than a first rotation speed that is the rotation speed of the engine at a maximum matching point where an upper limit target input torque line and an engine torque line intersect and in which the sum of the work implement required power and the transmission required power is greater than a first distributable power that a predetermined preferential distribution power subtracted from a load upper limit power of the engine at the first rotation speed leaves, the distribution ratio determination unit allocates the smaller of a transmission compensation power and the transmission required power to the power transmission device and distributes the remainder of the first distributable power to the work implement pump and to the power transmission device, thereby determining a first work implement allocation power allocated to the work implement pump and a first transmission allocation power allocated to the power transmission device.

The distribution ratio determination unit may preferentially allocate the remainder of the first distributable power to the work implement pump over the power transmission device to be able to preferentially secure the work implement required power in the first case.

When the engine rotates at a second rotation speed slower than the first rotation speed, the load upper limit power of the engine at the second rotation speed may be calculated on the basis of a torque value of the upper limit target input torque line at the second rotation speed. Moreover, in a second case in which the engine rotates at the second rotation speed and in which the sum of the work implement required power and the transmission required power is greater than a second distributable power that the preferential distribution power subtracted from the load upper limit power of the engine at the second rotation speed leaves, the distribution ratio determination unit may allocate the smaller of a creep power, which is required by the power transmission device so that the work vehicle travels at the minimum speed, and the transmission required power to the power transmission device and may distribute the remainder of the second distributable power to the work implement pump and to the power transmission device, thereby determining a second work implement allocation power allocated to the work implement pump and a second transmission allocation power allocated to the power transmission device.

The distribution ratio determination unit may determine, in the second case, the first work implement allocation power and the first transmission allocation power, assuming a case in which the engine rotates at the first rotation speed. The distribution ratio determination unit may determine a work implement proportional allocation power so that the ratio of the first transmission allocation power with respect to the first work implement allocation power and the ratio of a transmission proportional allocation power with respect to a work implement proportional allocation power are equal and so that a sum of the work implement proportional allocation power and the transmission proportional allocation power is equal to the second distributable power. The distribution ratio determination unit may preferentially allocate the remainder of the second distributable power to the work implement pump over the power transmission device so as to be able to preferentially secure the smaller of the work implement required power and the work implement proportional allocation power.

The work vehicle may be further provided with an energy reservoir for storing energy generated in the motor. The control unit further has an energy management requirement determination unit for determining an energy management required power on the basis of a remaining amount of energy in the energy reservoir. The preferential distribution power may include the energy management required power.

The transmission compensation power may be a predetermined first power while the absolute value of the vehicle speed is in a range from zero up to a first speed. The transmission compensation power may become correspondingly smaller than the first power as the absolute value of the vehicle speed increases while an absolute value of the vehicle speed is in a range from the first speed up to and including a second speed greater than the first speed. The transmission compensation power may be a predetermined second power smaller than the first power when the absolute value of the vehicle speed is equal to or greater than the second speed.

The work vehicle may be further provided with a shift operating member and a shift operation detecting unit. The shift operation detecting unit detects a position of the shift operating member. The first speed and the second speed may be set is response to a variable speed level detected by the shift operation detecting unit.

The control unit may further include a target-input-torque determination unit, a target-output-torque determination unit, a storage unit, and a command-torque determination unit. The target-input-torque determination unit determines a target input torque. The target input torque is a torque target value inputted to the power transmission device. The target-output-torque determination unit determines a target output torque. The target output torque is a torque target value outputted from the power transmission device. The storage unit stores torque-balance information. The torque-balance information defines a relationship between the target input torque and the target output torque so as to achieve a balance of the torques in the power transmission device. The command-torque determination unit uses the torque-balance information to determine command torque to the motor from the target input torque and the target output torque.

A control method according to a second exemplary embodiment of the present invention is a work vehicle control method. A work vehicle is equipped with an engine, a work implement pump, a work implement, a travelling apparatus, a power transmission device, a vehicle speed detecting unit, a work implement pump pressure detecting unit, a work implement operating member, a work implement operation detecting unit, an accelerator operating member, and an accelerator operation detecting unit. The work implement pump is driven by the engine. The work implement is driven by hydraulic fluid discharged from the work implement pump. The travelling apparatus is driven by the engine. The power transmission device includes at least an input shaft for inputting driving power from the engine, an output shaft for outputting driving power transferred to the travelling apparatus, and a motor. The power transmission device is configured so that a rotation speed ratio of the output shaft with respect to the input shaft is changed by changing the rotation speed of the motor. The vehicle speed detecting unit detects the vehicle speed. The work implement pump pressure detecting unit detects the work implement pump pressure of the work implement pump. The work implement operating member is a member for operating the work implement. The work implement operation detecting unit detects an operation amount of the work implement operating member. The accelerator operation detecting unit detects an operation amount of the accelerator operating member. The control method according to the present embodiment includes the following steps. In a first step, a work implement required power is determined on the basis of an operation amount of the work implement operating member and the work implement pump pressure. In a second step, a transmission required power is determined on the basis of the vehicle speed and the operation amount of the accelerator operating member. In a third step, a transmission output ratio and a work implement output ratio are determined. The transmission output ratio is a value derived by dividing the driving power actually supplied from the engine to the power transmission device by the transmission required power. The work implement output ratio is a value derived by dividing the driving power actually supplied from the engine to the work implement pump by the work implement required power. The third step is characterized in that, in a first case in which the engine rotates at a rotation speed equal to or greater than a first rotation speed that is the rotation speed of the engine at a maximum matching point where an upper limit target input torque line and an engine torque line intersect and in which the sum of the work implement required power and the transmission required power is greater than a first distributable power that a predetermined preferential distribution power subtracted from a load upper limit power of the engine at the first rotation speed leaves, the smaller of a transmission compensation power and the transmission required power is allocated to the power transmission device and the remainder of the first distributable power is distributed to the work implement pump and to the power transmission device, thereby determining a first work implement allocation power allocated to the work implement pump and a first transmission allocation power allocated to the power transmission device.

According to exemplary embodiments of the present invention, the transmission compensation power is preferentially allocated to the power transmission device when the driving power of the engine is less than the entire required power of the work vehicle and the transmission required power is greater than the transmission compensation power. The transmission compensation power simulates the power absorbed by the torque converter. Therefore, according to exemplary embodiments of the present invention, a work vehicle and a work vehicle control method can be provided that enable the distribution of driving power from the engine to driving power for the travel of the vehicle and driving power for the work implement to be able to reproduce the same operation feeling as that of a torque converter-type vehicle.

DESCRIPTION OF EXEMPLARY EMBODIMENTS

Figure 1:
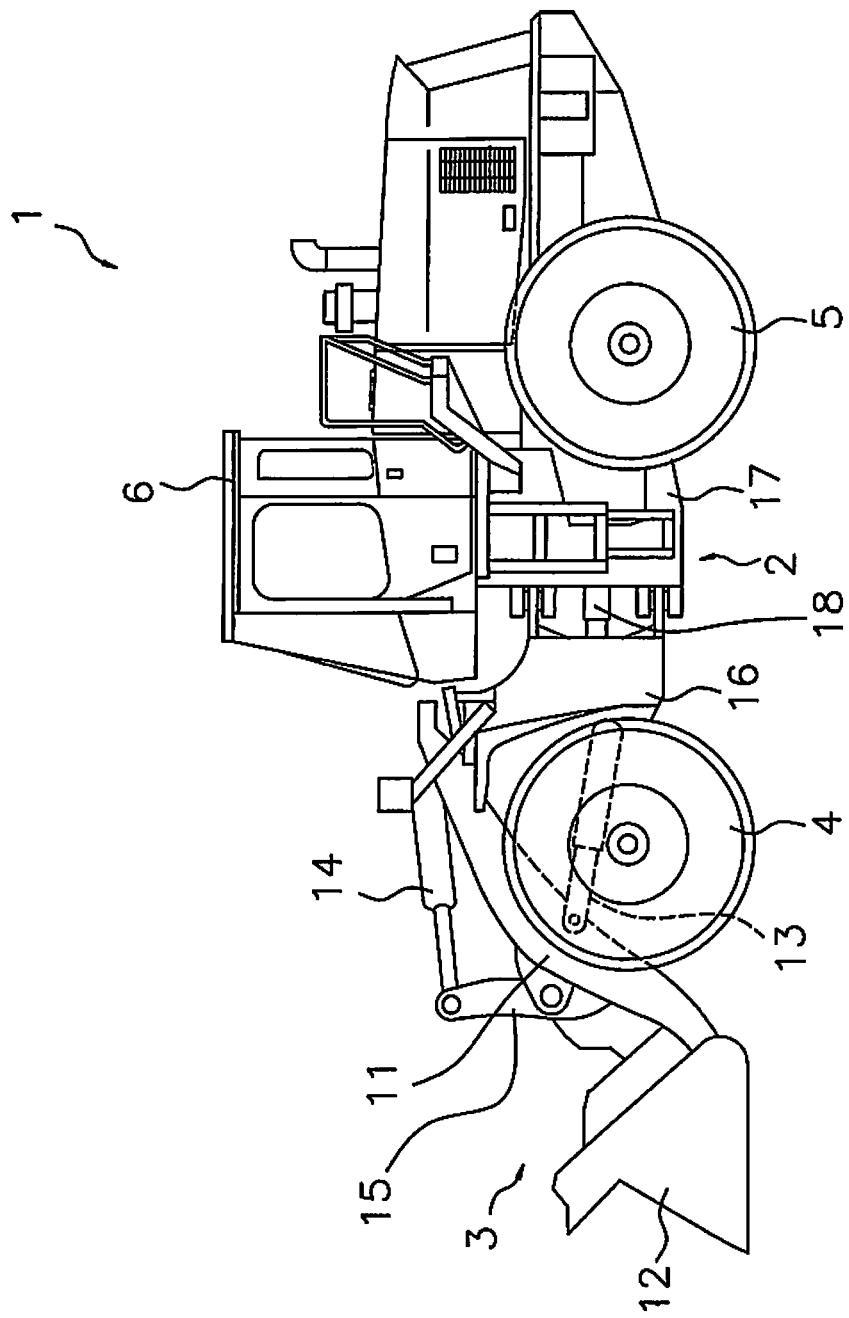
FIG. 1 is a side view of a work vehicle according to an exemplary embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The work implement 3 and the traveling wheels 4 are attached to the vehicle body frame 2. The work implement 3 is driven by hydraulic fluid from a below-mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 with hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 with hydraulic fluid from the work implement pump 23.

The operating cabin 6 and the traveling wheels 5 are attached to the vehicle body frame 2. The operating cabin 6 is mounted on the vehicle body frame 2. A seat for the operator and a below-mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below-mentioned steering pump 30.

Figure 2:
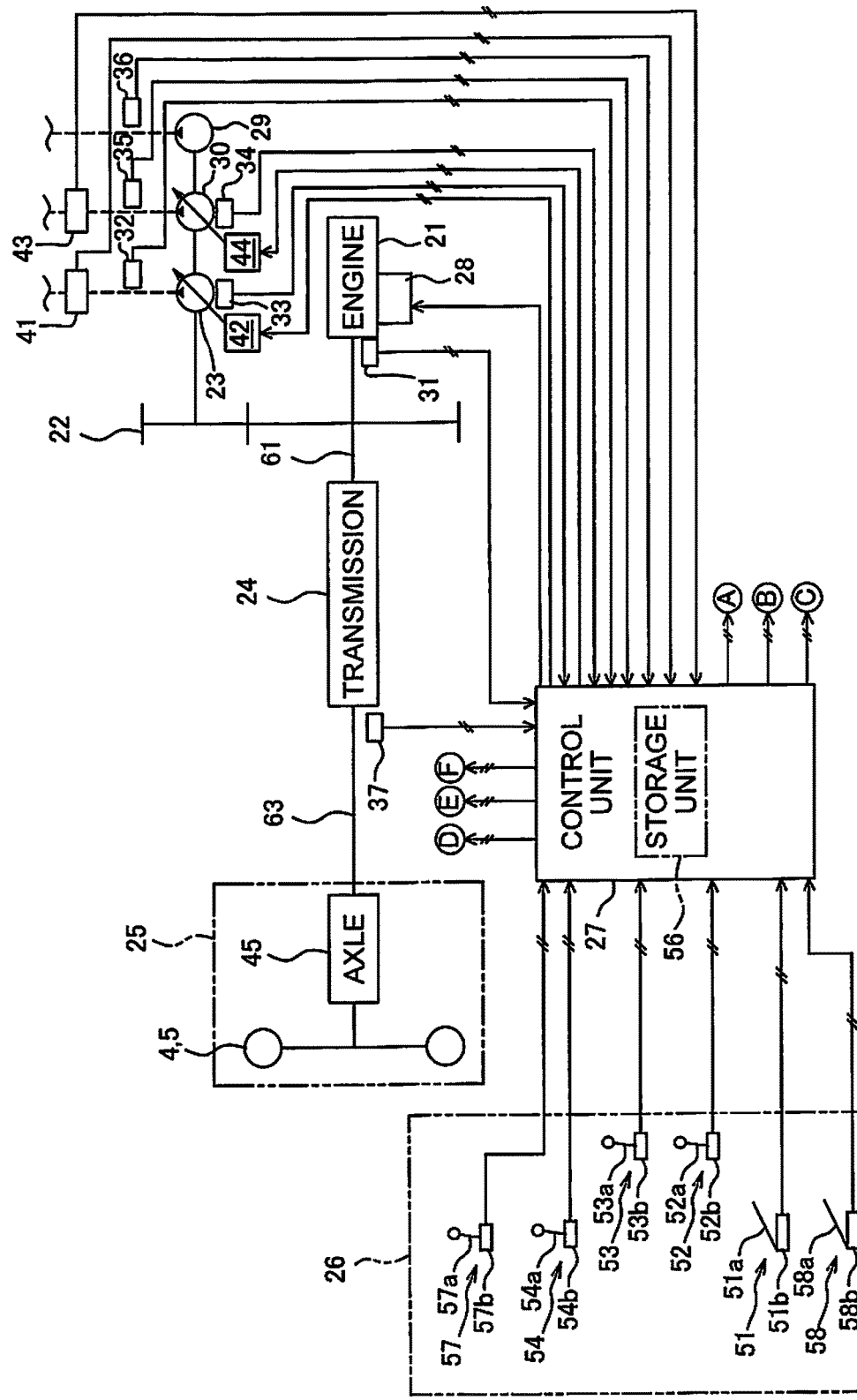
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off (PTO) 22, a power transmission device 24, a travelling apparatus 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the power transmission device 24 and the engine 21 to the hydraulic pumps 23, 30, and 29.

The work implement pump 23 is driven by driving power from the engine 21. Hydraulic fluid discharged from the work implement pump 23 is supplied to the lift cylinder 13 and the bucket cylinder 14 through a work implement control valve 41. The work implement control valve 41 changes the flow rate of the hydraulic fluid supplied to the lift cylinder 13 and to the bucket cylinder 14 in response to an operation of a below-mentioned work implement operating member 52a. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. The discharge capacity signifies the amount of hydraulic fluid discharged for each single rotation of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting part 33. The first tilt angle detecting part 33 detects the tilt angle of the work implement pump 23 and transmits a detection signal indicating the tilt angle to the control unit 27.

The steering pump 30 is driven by driving power from the engine 21. The hydraulic fluid discharged from the steering pump 30 is supplied to the above-mentioned steering cylinder 18 through a steering control valve 43. The work vehicle 1 is equipped with a steering pump pressure detecting unit 35. The steering pump pressure detecting unit 35 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting part 34. The second tilt angle detecting part 34 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power transmission device 24 via below-mentioned clutch control valves VF, VR, VL, and VH. The work vehicle 1 is equipped with a transmission pump pressure detecting unit 36. The transmission pump pressure detecting unit 36 detects the discharge pressure (referred to below as "transmission pump pressure") of the hydraulic fluid from the transmission pump 29 and transmits a detection signal indicating the transmission pump pressure to the control unit 27.

The PTO 22 transmits a portion of the driving power from the engine 21 to the power transmission device 24. The power transmission device 24 transmits the driving power from the engine 21 to the travelling apparatus 25. The power transmission device 24 changes the speed and outputs the driving power from the engine 21. An explanation of the configuration of the power transmission device 24 is provided in detail below.

The travelling apparatus 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by an operator. The operating device 26 has an accelerator operating device 51, a work implement operating device 52, a shift operating device 53, an FR operating device 54, a steering operating device 57, and a brake operating device 58.

The accelerator operating device 51 has an accelerator operating member 51a and an accelerator operation detecting unit 51b. The accelerator operating member 51a is operated to set a target rotation speed of the engine 21. The accelerator operation detecting unit 51b detects an operating amount (referred to below as "accelerator operating amount") of the accelerator operating member 51a. The accelerator operation detecting unit 51b transmits a detection signal indicating the accelerator operating amount to the control unit 27.

The work implement operating device 52 has a work implement operating member 52a and a work implement operation detecting unit 52b. The work implement operating member 52a is operated to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects an operation amount (referred to below as "boom operation amount") of the work implement operating member 52a for operating the boom 11 and an operation amount (referred to below as "bucket operation amount") of the work implement operating member 52a for operating the bucket 14, by detecting the position of the work implement operating member 52a. The work implement operating member 52 is configured for example with one lever and the operation of the boom 11 and the operation of the bucket 14 may be assigned to operating directions of the lever. Alternatively, the work implement operating member 52 is configured for example with two levers and the operation of the boom 11 and the operation of the bucket 14 may be assigned to each lever.

The shift operating device 53 has a shift operating member 53a and a shift operation detecting unit 53b. The operator is able to select a speed range of the power transmission device 24 by operating the shift operating member 53a. The shift operation detecting unit 53b detects a position of the shift operating member 53a. The position of the shift operating member 53a corresponds to a plurality of speed ranges, such as a first speed and a second speed and the like. The speed ranges (first speed, second speed, and the like) determined by the shift operating member 53a are referred to herein as variable speed levels. The shift operation detecting unit 53b outputs a detection signal indicating the position of the shift operating member 53a to the control unit 27. Specifically, the shift operation detecting unit 53b detects the variable speed level and outputs a detection signal indicating the variable speed level to the control unit 27.

The FR operating device 54 has a FR operating member 54a and a FR operation detecting unit 54b. The operator can switch between forward and reverse travel of the work vehicle 1 by operating the FR operating member 54a. The FR operating member 54a is selectively switched between a forward travel position (F), a neutral position (N), and a reverse travel position (R). The FR operation detecting unit 54b detects a position of the FR operating member 54a. The FR operation detecting unit 54b outputs a detection signal indicating the position of the FR operating member 54a to the control unit 27.

The steering operating device 57 has a steering operating member 57a and a steering operation detecting unit 57b. The operator is able to change the travel direction of the work vehicle 1 to the right or left by operating the steering operating member 57a. The steering operation detecting unit 57b detects a position of the steering operating member 57a.

The steering operation detecting unit 57b outputs a detection signal indicating the position of the steering operating member 57a to the control unit 27.

The brake operating device 58 has a brake operating member 58a and a brake operation detecting unit 58b. The operator actuates a brake device (not illustrated) to generate a braking force on the work vehicle 1 by operating the brake operating member 58a. The brake operation detecting unit 58b detects a position of the brake operating member 58a. The brake operation detecting unit 58b outputs a detection signal indicating the position of the brake operating member 58a to the control unit 27.

The control unit 27 has a calculation device, such as a CPU, and a memory, such as a RAM or a ROM, and conducts various types of processing for controlling the work vehicle 1. The control unit 27 has a storage unit 56. The storage unit 56 stores various types of programs and data for controlling the work vehicle 1.

The control unit 27 transmits a command signal indicating a command throttle value to the fuel injection device 28 so that a target rotation speed of the engine 21 is obtained in accordance with the accelerator operating amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52b.

As a result, the hydraulic cylinders 13 and 14 expand or contract to operate the work implement 3.

The control unit 27 controls the hydraulic pressure supplied to the steering cylinder 18 by controlling the steering control valve 43 on the basis of the detection signals from the steering operation detecting unit 57b. As a result, the steering cylinder 18 is extended and contracted and the traveling direction of the wheel loader 1 is changed.

Specifically, the storage unit 56 stores work implement control valve command value information which defines the relationship between the work implement operation amount and the command current value to the work implement control valve 41. For example, the work implement control valve command value information is a map which defines the relationship between the work implement operation amount and the command current value to the work implement control valve 41. The work implement control valve command value information may be a table or a formula or in another format other than a map. The opening surface area of the work implement control valve 41 is determined in response to the command current value. The work implement control valve command value information defines the command current value so that the opening surface area of the work implement control valve 41 increases in correspondence to an increase in the work implement operation amount. The control unit 27 refers to the work implement control valve command value information to determine the command current value to the work implement control valve 41 from the work implement operation amount.

The control unit 27 controls the power transmission device 24 on the basis of the detection signals from each of the detecting units. The control of the power transmission device 24 by the control unit 27 is described in detail below.

Figure 3:
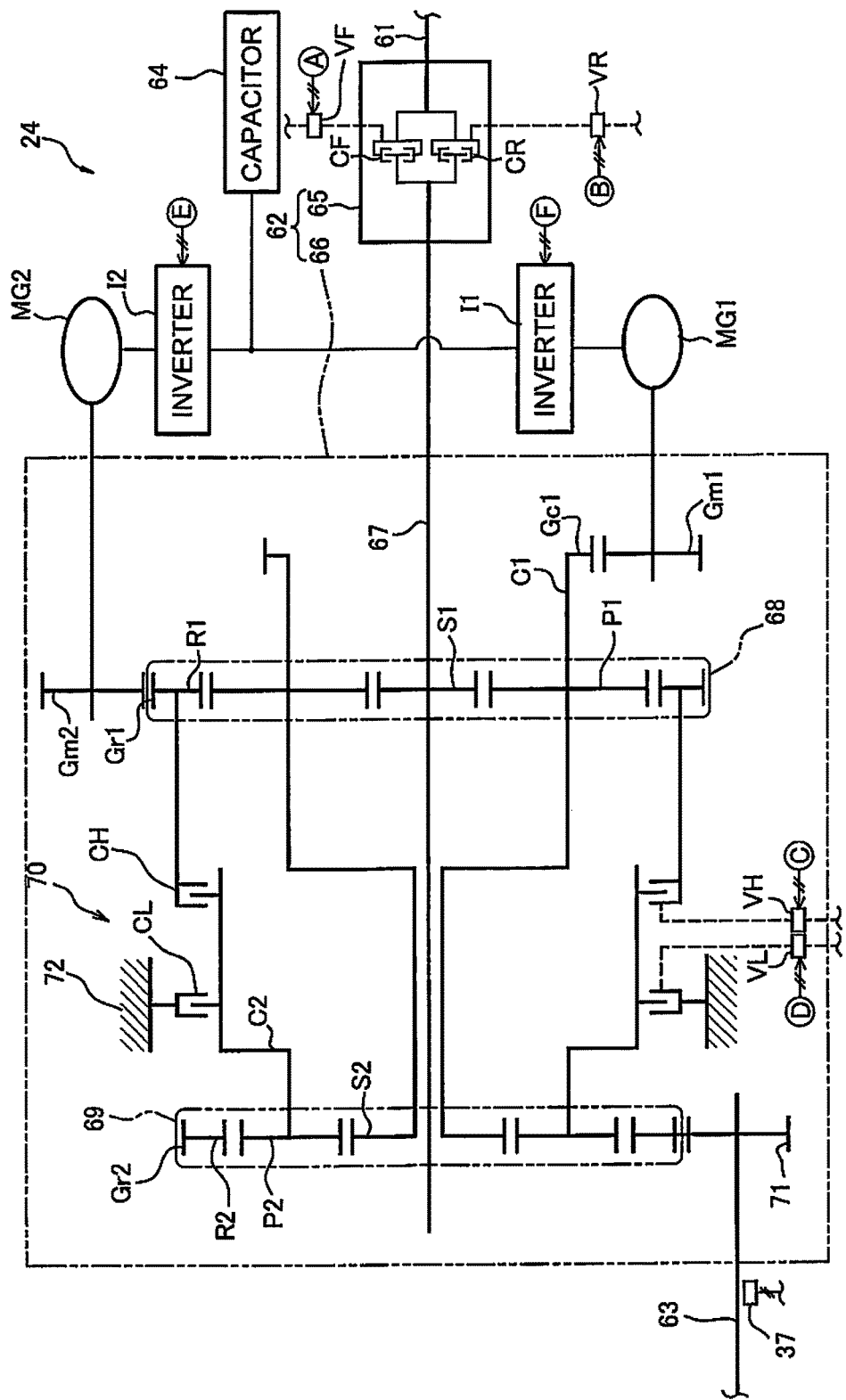
FIG. 3 is a schematic view of a configuration of a power transmission device.

Next, a detailed explanation of the configuration of the power transmission device 24 is provided. FIG. 3 is a schematic view of a configuration of the power transmission device 24. As illustrated in FIG. 3, the power transmission device 24 is provided with an input shaft 61, a gear mechanism 62, the output shaft 63, a first motor MG1, a second motor MG2, and a capacitor 64. The input shaft 61 is connected to the above-mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above-mentioned travelling apparatus 25, and transmits the rotation from the gear mechanism 62 to the above-mentioned travelling apparatus 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65 and a transmission mechanism 66.

The FR switch mechanism 65 has a forward movement clutch CF, a reverse movement clutch CR, and various types of gears (not illustrated). The forward movement clutch CF and the reverse movement clutch CR are hydraulic clutches and hydraulic fluid is supplied from the transmission pump 29 to the clutches CF and CR. The hydraulic fluid for the forward movement clutch CF is controlled by an F-clutch control valve VF. The hydraulic fluid for the reverse movement clutch CR is controlled by an R-clutch control valve VR. The clutch control valves CF and CR are controlled by command signals from the control unit 27. The direction of the rotation outputted from the FR switch mechanism 65 is switched due to the switching between ON (connection)/OFF (disconnection) of the forward movement clutch CF and ON (connection)/OFF (disconnection) of the reverse movement clutch CR.

The transmission mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same axis as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power transmission path of the power transmission device 24 between a high-speed mode (Hi-mode) in which the vehicle speed is high and a low-speed mode (Lo-mode) in which the vehicle speed is low. The Hi/Lo switch mechanism 70 has an H-clutch CH that is ON during the Hi-mode and an L-clutch CL that is ON during the Lo-mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. The clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied so that torque acts in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter I1 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27.

The capacitor 64, which as an energy reservoir, stores energy generated by the motors MG1 and MG2. That is, the capacitor 64 stores electrical power generated by the motors MG1 and MG2 when the total electrical power generation amount of the motors MG1 and MG2 is high. The capacitor 64 releases electrical power when the total electrical power consumption amount of the motors MG1 and MG2 is high. That is, the motors MG1 and MG2 are driven by electrical power stored in the capacitor 64. A battery may be used as another electrical power storage means in place of a capacitor.

The control unit 27 receives detection signals from the various detecting units and applies command signals for indicating the command torques for the motors MG1 and MG2 to the inverters I1 and I2. The control unit 27 also applies command signals for controlling the clutch hydraulic pressure of the clutches CF, CR, CH, and CL to the clutch control valves VF, VR, VH, and VL. As a result, the transmission gear ratio and the output torque of the power transmission device 24 are controlled. The following is an explanation of the operations of the power transmission device 24.

Figure 4:
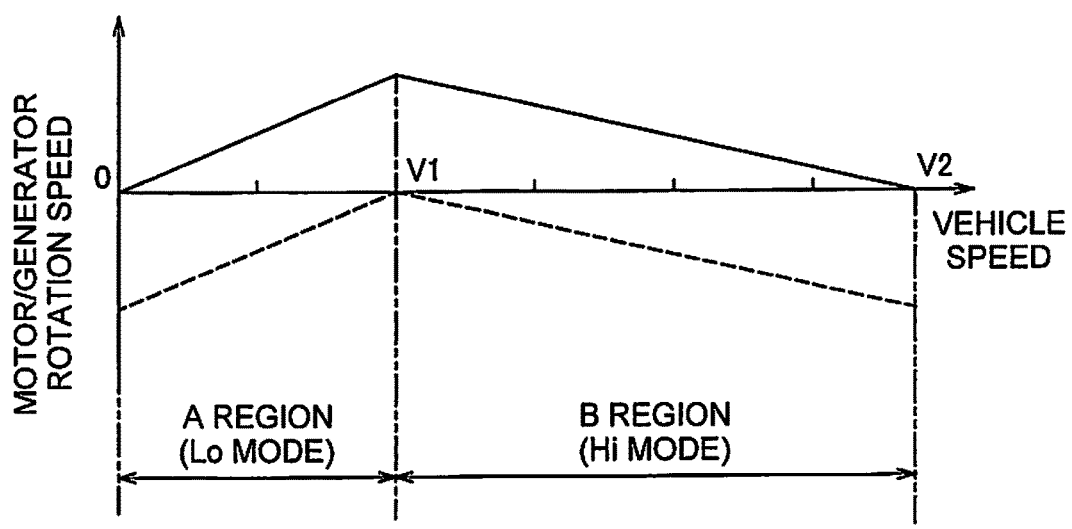
FIG. 4 illustrates changes in the rotation speeds of a first motor and a second motor with respect to the vehicle speed.

An outline of operations of the power transmission device 24 when the vehicle speed increases from zero in the forward movement side while the rotation speed of the engine 21 remains fixed, will be explained with reference to FIG. 4. FIG. 4 illustrates the rotation speeds of the motors MG1 and MG2 with respect to the vehicle speed. When the rotation speed of the engine 21 is fixed, the vehicle speed changes in response to the rotation speed ratio of the power transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power transmission device 24. That is, FIG. 4 illustrates the relationship between the rotation speeds of the motors MG1 and MG2 and the rotation speed ratio of the power transmission device 24. The solid line in FIG. 4 represents the rotation speed of the first motor MG1, and the dashed line represents the rotation speed of the second motor MG2.

In an A region (Lo-mode) with a vehicle speed from zero to V1, the L-clutch CL is ON (connected) and the H-clutch CH is OFF (disconnected). Because the H-clutch CH is OFF in the A region, the second carrier C2 and the first ring gear R1 are disconnected. Because the L-clutch CL is ON, the second carrier C2 is fixed.

The driving power from the engine 21 in the A region is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the A region, and the electrical power generated by the second motor MG2 is supplied to the first motor MG1 or stored in the capacitor 64 as needed.

The first motor MG1 functions mainly as an electric motor in the A region. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted from the output shaft 63 along a path from the second planet gears P2 to the second ring gear R2 to the second ring outer periphery gear Gr2 to the output gear 71.

In a B region (Hi-mode) in which the vehicle speed exceeds V1, the H-clutch CH is ON (connected) and the L-clutch CL is OFF (disconnected). Because the H-clutch CH is ON in the B region, the second carrier C2 and the first ring gear R1 are connected. Because the L-clutch CL is OFF, the second carrier C2 is released. Therefore, the rotation speeds of the first ring gear R1 and the second carrier C2 match.

The driving power from the engine 21 in the B region is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the B region, and thus the electrical power generated by the first motor MG1 is supplied to the first motor MG1 or stored in the capacitor 64 as needed.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward travel driving has been discussed above, the operations of reverse travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device by controlling the motor torque of the first motor MG1 and the second motor MG2. That is, the control unit 27 controls the tractive force of the work vehicle 1 by controlling the motor torque of the first motor MG1 and the second motor MG2.

Figure 5:
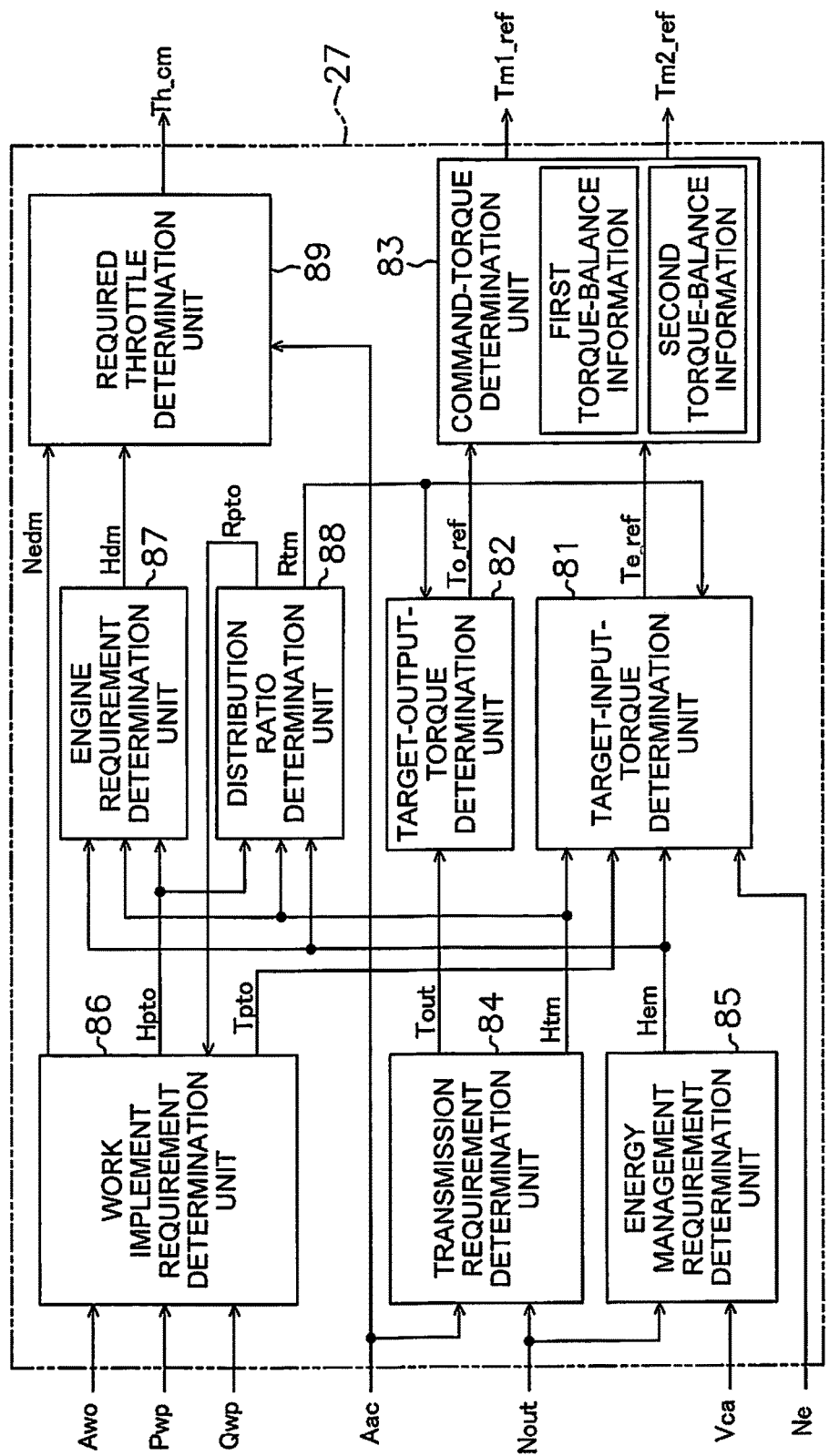
FIG. 5 is a control block diagram illustrating an overall outline of processing executed by a control unit.
Figure 6:
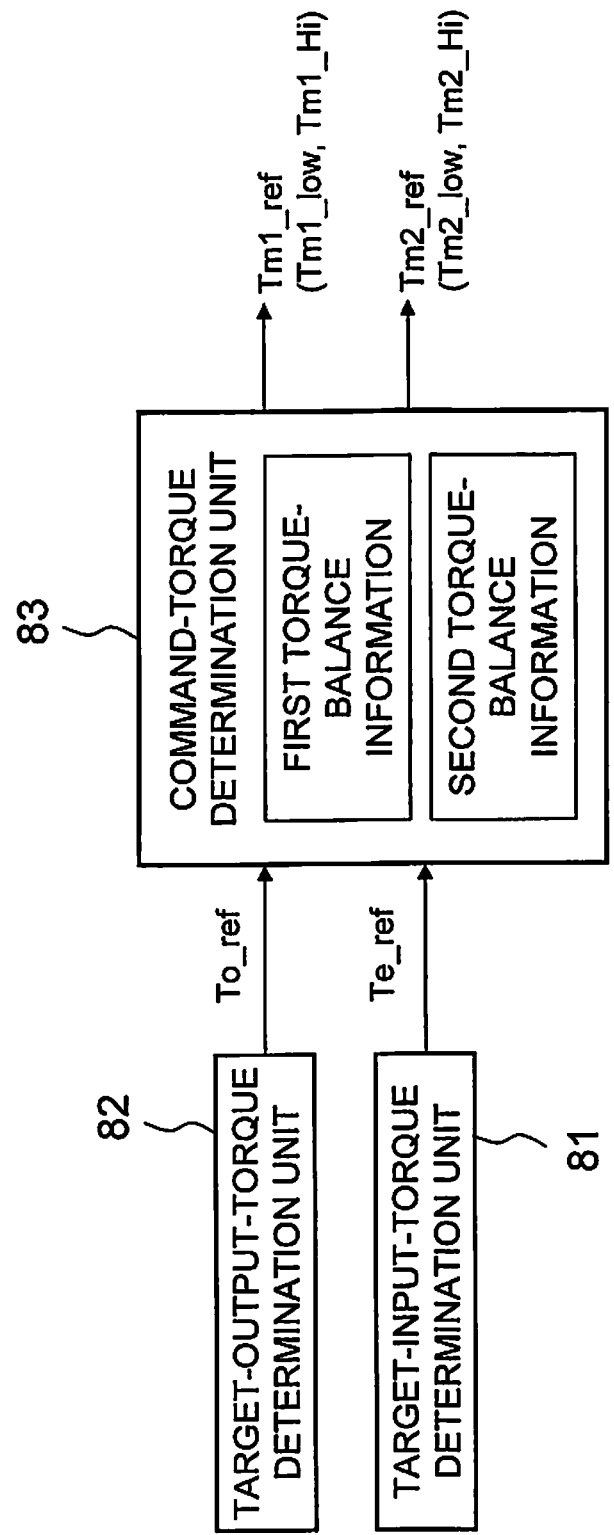
FIG. 6 is a control block diagram illustrating processing executed by the control unit to determine command torques for the motors in the Lo-mode and the Hi-mode.

A method for determining the command values (referred to below as "command torques") of the motor torques to the first motor MG1 and the second motor MG2 is explained below. FIGS. 5 to 13 are control block diagrams illustrating processing executed by the control unit 27. As illustrated in FIGS. 5 and 6, the control unit 27 has a target-input-torque determination unit 81, a target-output-torque determination unit 82, and a command-torque determination unit 83.

The target-input-torque determination unit 81 determines a target input torque Te_ref. The target input torque Te_ref is a target value for the torque inputted to the power transmission device 24. The target-output-torque determination unit 82 determines a target output torque To_ref. The target output torque To_ref is a target value for the torque outputted from the power transmission device 24. The command-torque determination unit 83 uses torque-balance information to determine command torques Tm1_ref and Tm2_ref to the motors MG1 and MG2 from the target input torque Te_ref and the target output torque To_ref. The torque-balance information defines a relationship between the target input torque Te_ref and the target output torque To_ref so as to achieve a balance of the torques of the power transmission device 24. The torque-balance information is stored in the storage unit 56.

As described above, the transmission paths of the driving power in the power transmission device 24 are different for the Lo-mode and the Hi-mode. As a result, the command-torque determination unit 83 uses different torque-balance information to determine the command torques Tm1_ref and Tm2_ref for the motors MG1 and MG2 in the Lo-mode and the Hi-mode. Specifically, the command-torque determination unit 83 uses first torque-balance information represented by equation 1 below to determine command torques Tm1_Low and Tm2_Low for the motors MG1 and MG2 in the Lo-mode. In the present exemplary embodiment, the first torque-balance information is an equation for balancing the torques of the power transmission device 24.

$Ts1\_Low = Te\_ref * r\_fr$ $Tc1\_Low = Ts1\_Low * (-1) * ((Zr1/Zs1)+1)$ $Tr2\_Low = To\_ref * (Zod/Zo)$ $Ts2\_Low = Tr2\_Low * (Zs2/Zr2)$ $Tcp1\_Low = Tc1\_Low + Ts2\_Low$ $Tm1\_Low = Tcp1\_Low * (-1) * (Zp1/Zp1d)$ $Tr1\_Low = Ts1\_Low * (Zr1/Zs1)$ $Tm2\_Low = Tr1\_Low * (-1) * (Zp2/Zp2d)$    Equation 1

The command-torque determination unit 83 uses second torque-balance information represented by equation 2 below to determine command torques Tm1_Hi and Tm2_Hi for the motors MG1 and MG2 in the Hi-mode. In the present exemplary embodiment, the second torque-balance information is an equation for balancing the torques of the power transmission device 24.

$$Ts1\_Hi = Te\_ref * r\_fr$$

$$Tc1\_Hi = Ts1\_Hi * (-1) * ((Zr1/Zs1)+1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2)+1)$$

$$Tcp2\_Hi = Tr1\_Hi + Tc2\_Hi$$

$$Tm2\_Hi = Tcp2\_Hi * (-1) * (Zp2/Zp2d) \quad \text{Equation 2}$$

The contents of the parameters in each torque-balance information are depicted in Table 1 below.

TABLE 1

| | |
|---|---|
| Te_ref | Target input torque |
| To_ref | Target output torque |
| r_fr | Deceleration ratio for the FR switch mechanism 65 (The FR switch mechanism 65 outputs the engine rotation speed to decelerate to 1/r_fr. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

Next, a method for determining the target input torque Te_ref and the target output torque To_ref will be explained. While the target input torque Te_ref and the target output torque To_ref can be set optionally, in the present exemplary embodiment the target input torque Te_ref and the target output torque To_ref are determined so that predetermined vehicle speed—tractive force characteristics can be achieved in which the tractive force changes continuously in response to the vehicle speed.

Figure 7:
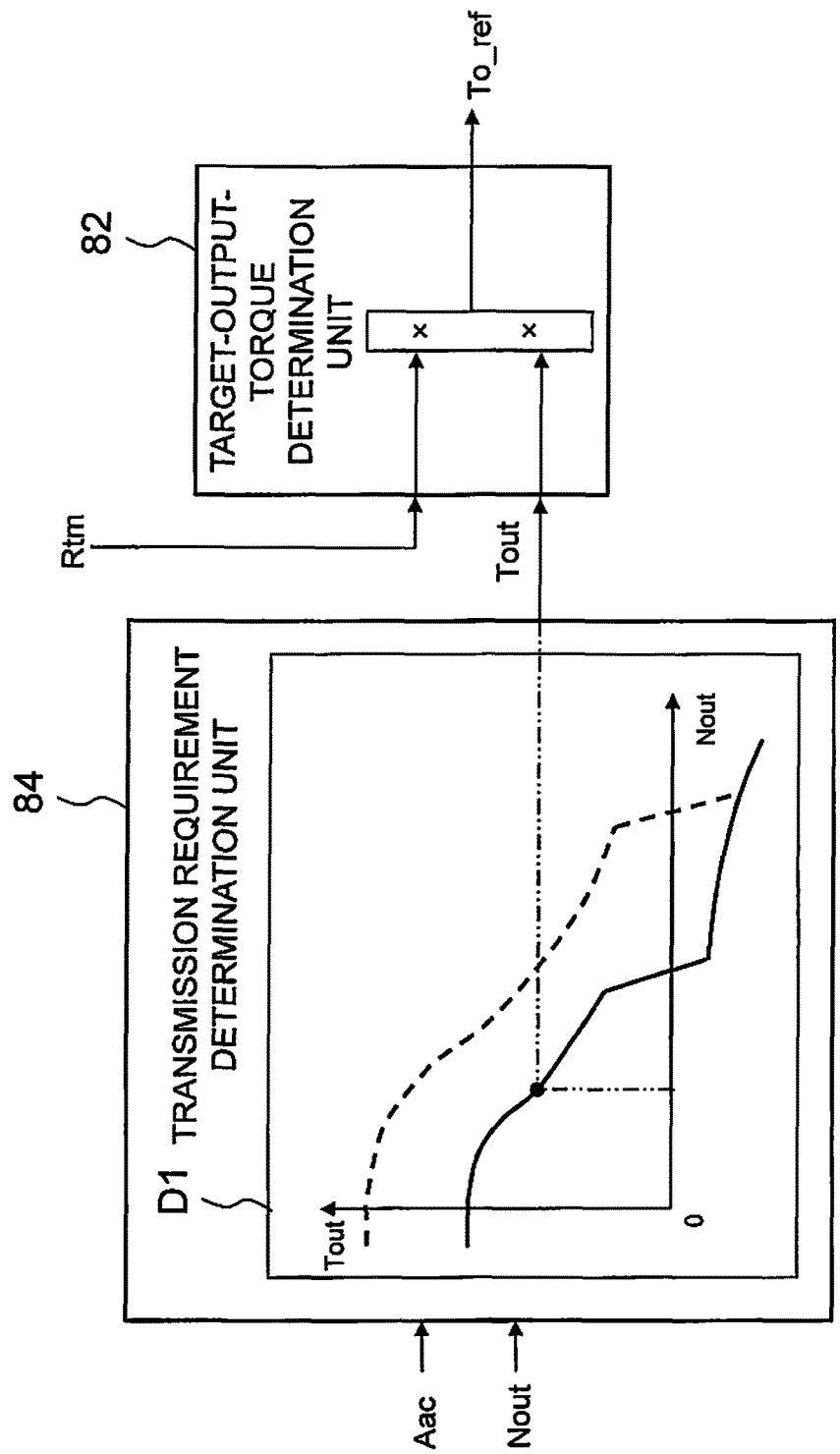
FIG. 7 is a control block diagram illustrating processing executed by the control unit to determine the target output torque.

FIG. 7 illustrates processing for determining the target output torque To_ref. As illustrated in FIG. 7, the control unit 27 has a transmission demand determination unit 84. The transmission demand determination unit 84 determines a required tractive force Tout on the basis of an accelerator operating amount Aac and an output rotation speed Nout. The accelerator operating amount Aac is detected by the accelerator operation detecting unit 51b. The output rotation speed Nout is detected by the vehicle speed detecting unit 37.

The transmission demand determination unit 84 determines the required tractive force Tout from the output rotation speed Nout on the basis of required tractive force characteristics information D1 stored in the storage unit 56. The target-output-torque determination unit 82 determines the target output torque To_ref on the basis of the required tractive force Tout. Specifically, the target-output-torque determination unit 82 determines the target output torque To_ref by multiplying a transmission output ratio Rtm by the required tractive force Tout. The transmission output ratio Rtm is explained below.

The required tractive force characteristics information D1 is data indicating the required tractive force characteristics for defining the relationship between the output rotation speed Nout and the required tractive force Tout. The required tractive force characteristics correspond to the above-mentioned predetermined vehicle speed—tractive force characteristics. That is, the target output torque To_ref is determined so that the tractive force outputted from the power transmission device 24 obeys the required tractive force characteristics defined by the required tractive force characteristics information D1.

Figure 8:
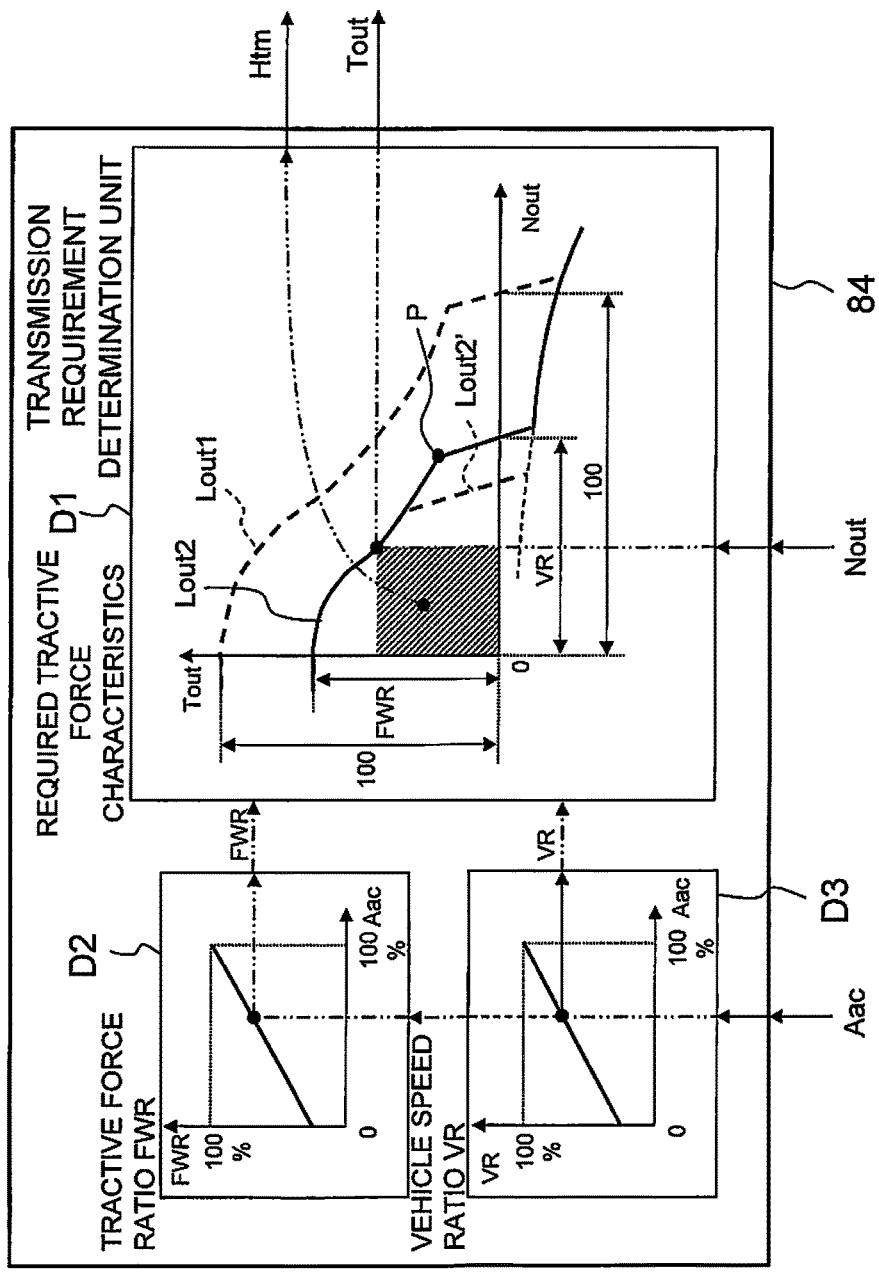
FIG. 8 is a control block diagram illustrating processing executed by the control unit to determine required tractive force characteristics.

Specifically, as illustrated in FIG. 8, the storage unit 56 stores data Lout1 (referred to below as "basic tractive force characteristics Lout1") indicating basic required tractive force characteristics. The basic tractive force characteristics Lout1 are required tractive force characteristics when the accelerator operating amount Aac is at the maximum value, that is, at 100%. The basic tractive force characteristics Lout1 are determined in response to a speed range selected by the shift operating member 53a. The transmission requirement determination unit 84 determines current required tractive force characteristics Lout2 by multiplying a tractive force ratio FWR and a vehicle speed ratio VR by the basic tractive force characteristics Lout1.

The storage unit 56 stores tractive force ratio information D2 and vehicle speed ratio information D3. The tractive force ratio information D2 defines the tractive force ratio FWR with respect to the accelerator operating amount Aac. The vehicle speed ratio information D3 defines the vehicle speed ratio VR with respect to the accelerator operating amount Aac. The transmission requirement determination unit 84 determines the tractive force ratio FWR and the vehicle speed ratio VR in response to the accelerator operating amount Aac. The transmission requirement determination unit 84 determines the current required tractive force characteristics Lout2 in response to the accelerator operating amount Aac by multiplying the tractive force ratio FWR in the vertical axis direction which indicates the required tractive force and the vehicle speed ratio VR in the horizontal axis direction which indicates the output rotation speed Nout, by the basic tractive force characteristics Lout1.

The tractive force ratio information D2 defines the tractive force ratio FWR that increases in correspondence to an increase in the accelerator operating amount Aac. The vehicle speed ratio information D3 defines the vehicle speed ratio VR which increases in correspondence to an increase in the accelerator operating amount Aac. However, the tractive force ratio FWR is greater than zero when the accelerator operating amount is zero. Similarly, the vehicle speed ratio VR is greater than zero when the accelerator operating amount Aac is zero. As a result, the required tractive force Tout is a value greater than zero even when the accelerator operating member 51a is not being operated. That is, tractive force is outputted from the power transmission device 24 even when the accelerator operating member 51a is not operated. As a result, a behavior similar to creep generated in a torque converter-type transmission is materialized in the EMT-type power transmission device 24.

The required tractive force characteristics information D1 defines the required tractive force Tout that increases in response to a reduction in the output rotation speed Nout. When the above-mentioned shift operating member 53a is operated, the transmission requirement determination unit 84 changes the required tractive force characteristics in response to the speed range selected by the shift operating member 53a. For example, when a down-shift is conducted using the shift operating member 53a, the required tractive force characteristics information changes from Lout2 to Lout2' as illustrated in FIG. 8. As a result, the upper limit of the output rotation speed Nout is reduced. That is, the upper limit of the vehicle speed is reduced.

The required tractive force characteristics information D1 defines the required tractive force Tout as a negative value with respect to the output rotation speed Nout that is equal to or greater than a predetermined speed. As a result, the required tractive force Tout is determined to be a negative value when the output rotation speed Nout is larger than the upper limit of the output rotation speed in the selected speed range. A braking force is generated when the required tractive force Tout is a negative value. As a result, a behavior similar to engine brake generated in a torque converter-type transmission is materialized in the EMT-type power transmission device 24.

Figure 9:
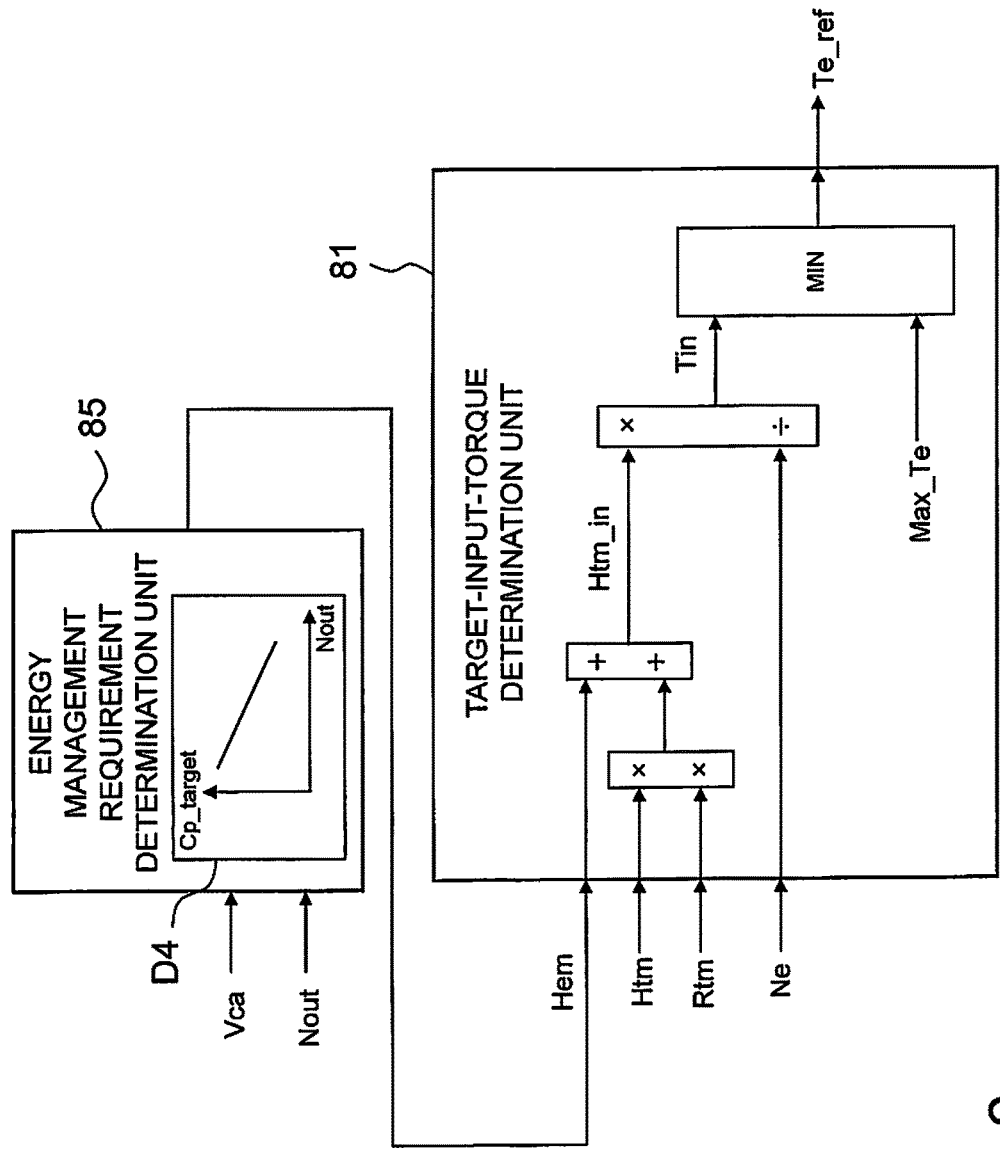
FIG. 9 is a control block diagram illustrating processing executed by the control unit to determine the target input torque.

FIG. 9 illustrates processing for determining the target input torque Te_ref. The target-input-torque determination unit 81 determines the target input torque Te_ref on the basis of a transmission required power Htm and an energy management required power Hem. Specifically, the target-input-torque determination unit 81 calculates a transmission required input power Htm_in by adding the energy management required power Hem to a value derived by multiplying the transmission output ratio Rtm by the transmission required power Htm. The transmission required power Htm is a power required by the power transmission device 24 for realizing the above-mentioned required tractive force characteristics, and is calculated by multiplying the current output rotation speed Nout by the above-mentioned required tractive force Tout (see FIG. 8). The energy management required power Hem is a power required by the power transmission device 24 for charging the below-mentioned capacitor 64. Therefore, the transmission required input power Htm_in is a power required for the output of a desired tractive force from the power transmission device 24 and for charging the capacitor 64 with the power transmission device 24. However, the Hem being a negative value signifies that charging of the capacitor 64 is required.

The target-input-torque determination unit 81 then converts the transmission required input power Htm_in to a torque and determines the target input torque Te_ref so as not to exceed a predetermined upper limit target input torque Max_Te. Specifically, the target-input-torque determination unit 81 calculates a transmission required input torque Tin by dividing the transmission required input power Htm_in by the current engine rotation speed Ne. The target-input-torque determination unit 81 then determines the smaller of the transmission required input torque Tin and the upper limit target input torque Max_Te as the target input torque Te_ref.

Figure 10:
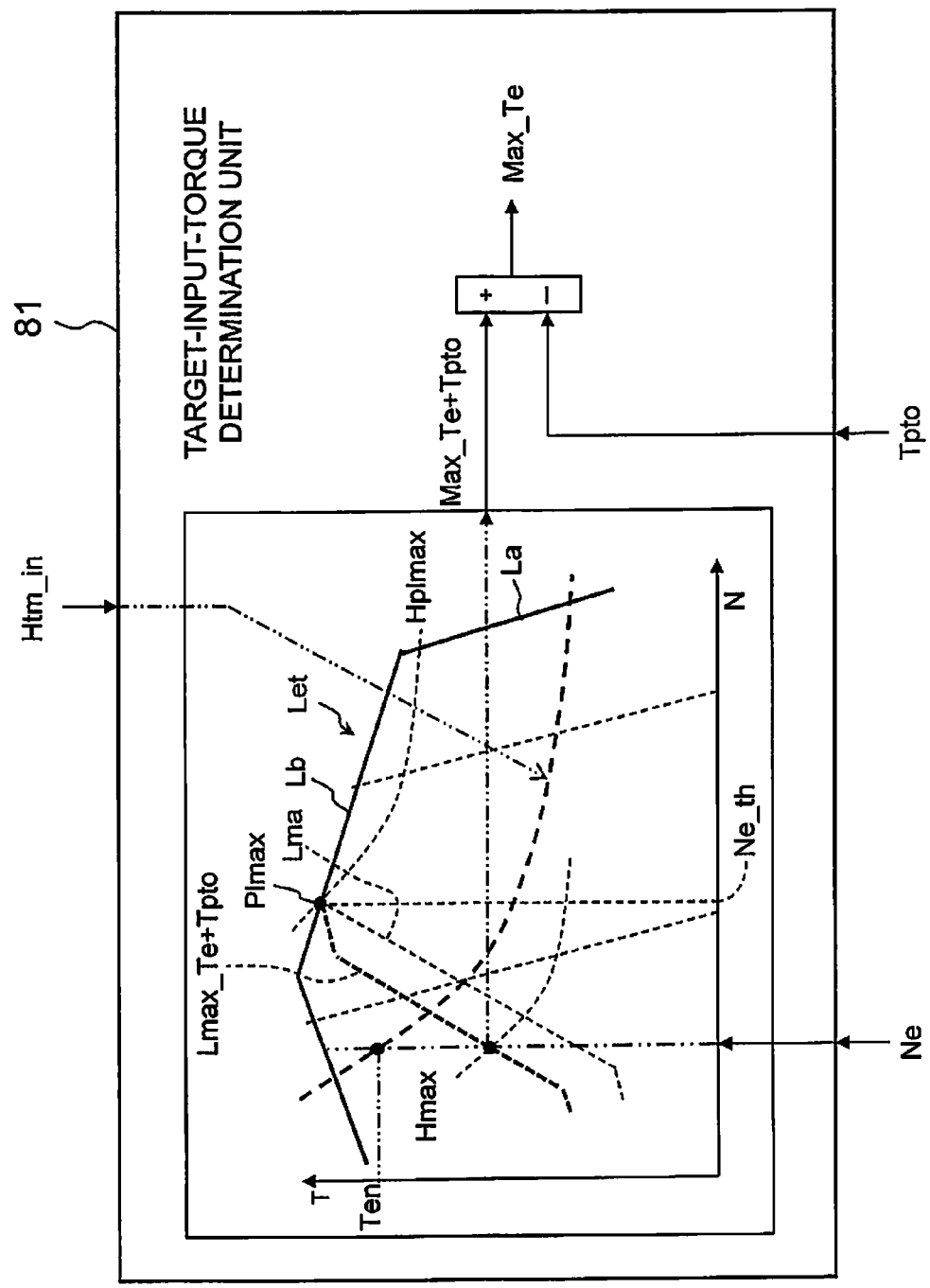
FIG. 10 is a control block diagram illustrating processing executed by the control unit to determine the upper limit target input torque.

FIG. 10 illustrates processing to determine the upper limit target input torque Max_Te. As illustrated in FIG. 10, the upper limit target input torque Max_Te is defined by an upper limit target input torque line Lmax_Te+Tpto. Specifically the target-input-torque determination unit 81 determines an upper limit target input torque Max_Te+Tpto from the upper limit target input torque line Lmax_Te+Tpto and the current engine rotation speed Ne.

The upper limit target input torque line Lmax_Te+Tpto is stored in the storage unit 56 and defines the relationship between the upper limit target input torque Max_Te+Tpto and the engine rotation speed Ne. While the upper limit target input torque line Lmax_Te+Tpto can be set optionally, the upper limit target input torque line Lmax_Te+Tpto in the present embodiment is defined so that the upper limit target input torque Max_Te+Tpto becomes smaller than a target output torque Ten of the engine 21 determined from the transmission required input power Htm_in and the current engine rotation speed Ne.

The upper limit target input torque Max_Te+Tpto derived from the upper limit target input torque line Lmax_Te+Tpto defines the upper limit of the target input torque that is a combination of both the transmission required input torque Tin and a work implement load torque Tpto. The work implement load torque Tpto is a torque distributed to the hydraulic pump 23 through the below-mentioned PTO 22. Therefore, the target-input-torque determination unit 81 calculates the upper limit target input torque Max_Te as the upper limit of the target input torque Te_ref by subtracting the work implement load torque Tpto from the upper limit target input torque Max_Te+Tpto which is derived from the upper limit target input torque line Lmax_Te+Tpto.

The storage unit 56 stores an engine torque line Let. The engine torque line Let defines the relationship between the output torque of the engine 21 and the engine rotation speed Ne. The engine torque line Let includes a regulation region La and a full load region Lb. An explanation of the regulation region La is provided below. The full load region Lb depicts the maximum torque that can be outputted by the engine in each of the engine rotation speeds Ne. The intersection Plmax of the upper limit target input torque line Lmax_Te+Tpto and the engine torque line Let (specifically the full load region Lb) is referred to herein as a maximum matching point. The engine rotation speed Ne corresponding to the maximum matching point Plmax is referred to as a first rotation speed Ne_th.

Next, a method for determining the energy management required power Hem will be explained. As illustrated in FIG. 9, the control unit 27 has an energy management requirement determination unit 85. The energy management requirement determination unit 85 determines the energy management required power Hem on the basis of a remaining amount of electrical power in the capacitor 64.

Specifically, the storage unit 56 stores target capacitor capacity information D4. The target capacitor capacity information D4 defines the relationship between the output rotation speed Nout and a target capacitor capacity Cp_target. Specifically, the energy management requirement determination unit 85 defines the target capacitor capacity Cp_target which grows smaller as the output rotation speed Nout increases. The energy management requirement determination unit 85 refers to the target capacitor capacity information D4 to determine the target capacitor capacity Cp_target from the output rotation speed Nout. The energy management requirement determination unit 85 determines a current capacitor capacity Cp_current from a voltage Vca of the capacitor 64. The energy management requirement determination unit 85 then determines the energy management required power Hem using the following equation 3.

$$Hem = (Cp\_target - Cp\_current) * P\_gain \quad \text{Equation 3}$$

P_gain is a predetermined coefficient. The energy management requirement determination unit 85 increases the energy management required power Hem as the current capacitor capacity Cp_current becomes smaller. The energy management requirement determination unit 85 increases the energy management required power Hem as the target capacitor capacity Cp_target becomes larger.

The control of the engine 21 by the control unit 27 is described in detail below. As described above, the control unit 27 controls the engine by transmitting command signals to the fuel injection device 28. A method for determining the command throttle values for the fuel injection device 28 will be explained below.

Figure 12:
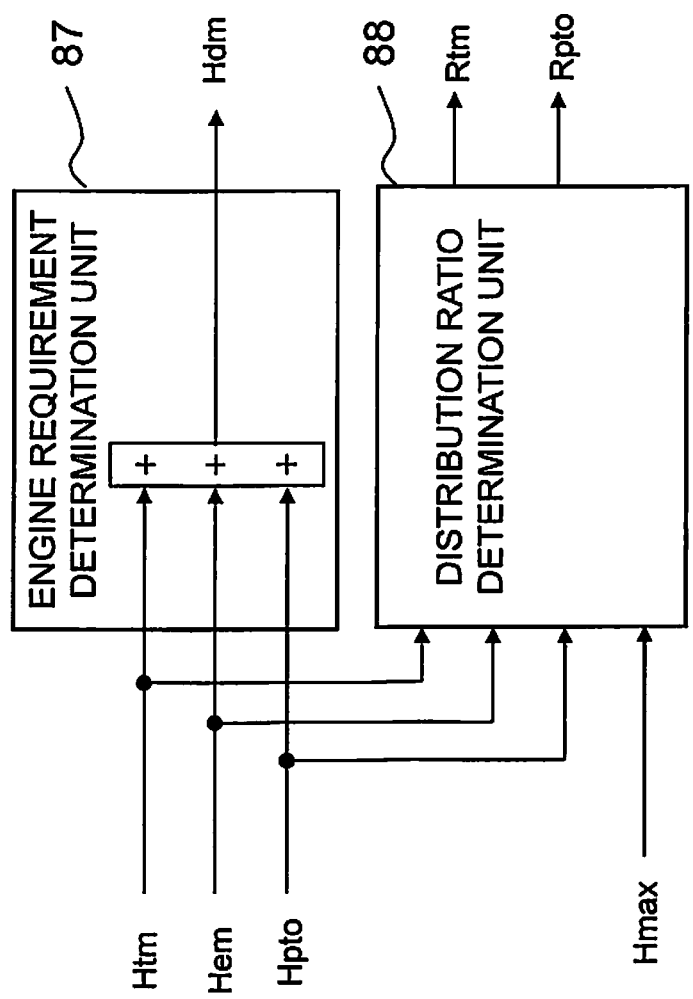
FIG. 12 is a control block diagram illustrating processing executed by the control unit to determine a command throttle value.

A command throttle value Th_cm is determined on the basis of an engine required power Hdm required by the engine 21 (see FIG. 12). As described above, a portion of the driving power from the engine 21 is distributed to the power transmission device 24 and the work implement pump 23 and the like. As a result, the control unit 27 determines the engine required power Hdm on the basis of a work implement required power Hpto, which is the power distributed to the work implement pump 23, added to the abovementioned transmission required power Htm and the energy management required power Hem.

Figure 11:
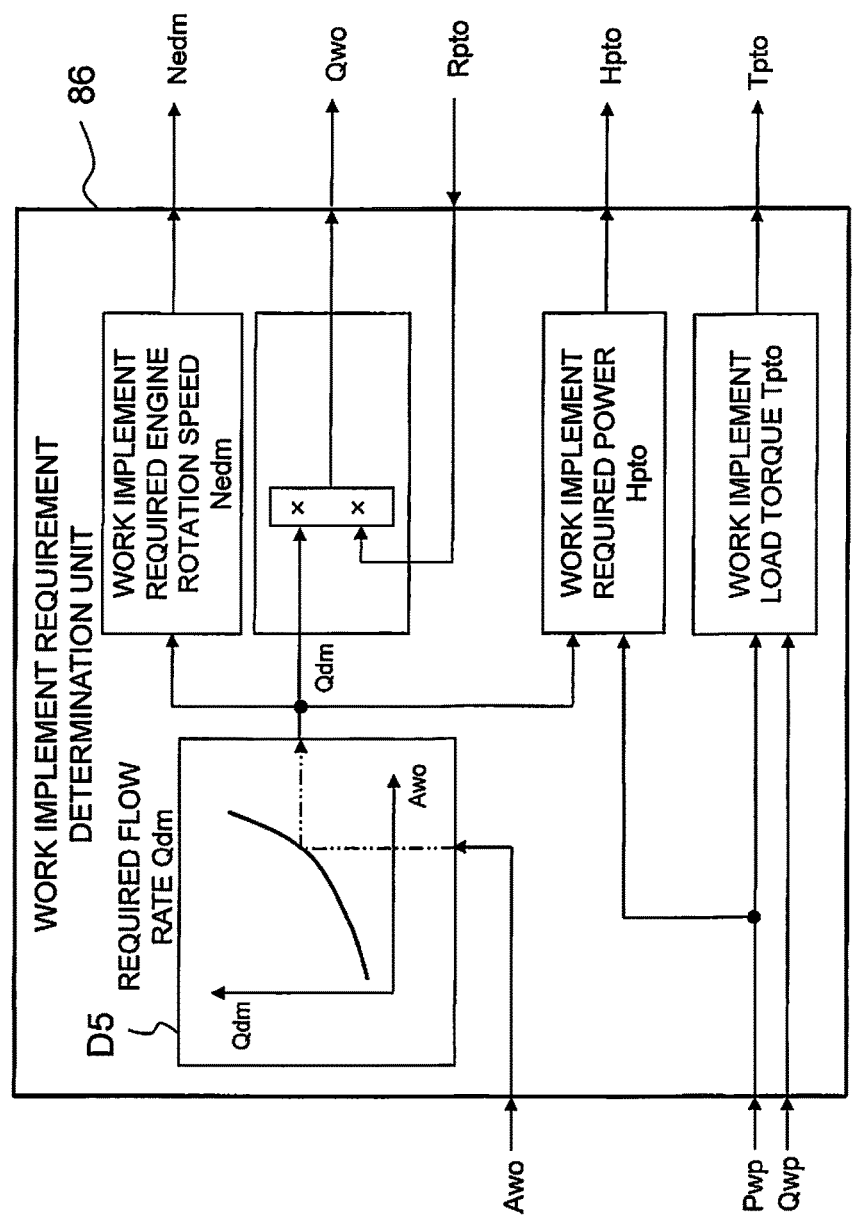
FIG. 11 is a control block diagram illustrating processing executed by the control unit including a work implement requirement determination unit to determine the work implement required power.

As illustrated in FIG. 11, the control unit 27 has a work implement requirement determination unit 86. The work implement requirement determination unit 86 determines the work implement required power Hpto on the basis of a work implement pump pressure Pwp and an operation amount Awo (referred to below as "work implement operation amount Awo") of the work implement operating member 52a. In the present exemplary embodiment, the work implement required power Hpto is a power distributed to the work implement pump 23.

Specifically, the work implement requirement determination unit 86 determines a required flow rate Qdm of the work implement pump 23 from the work implement operating amount Awo on the basis of required flow rate information D5. The required flow rate information D5 is stored in the storage unit 56 and defines the relationship between the required flow rate Qdm and the work implement operation amount Awo. The work implement requirement determination unit 86 determines the work implement required power Hpto from the required flow rate Qdm and the work implement pump pressure Pwp. Specifically, the work implement requirement determination unit 86 determines the work implement required power Hpto using the following equation 4.

$$Hpto = Qdm/\eta v * Pwp/\eta t \quad \text{Equation 4}$$

$\eta v$ is a volume efficiency. $\eta t$ is a torque efficiency. The volume efficiency $\eta v$ and the torque efficiency $\eta t$ are fixed values determined in accordance with the characteristics of the work implement pump 23. The work implement pump pressure Pwp is detected by the work implement pump pressure detecting unit 32.

The work implement requirement determination unit 86 determines the above-mentioned work implement load torque Tpto on the basis of the work implement pump pressure Pwp and a work implement output flow rate Qwo. The work implement pump pressure Pwp may be defined with a maximum pressure such as a relief pressure. Specifically, the work implement requirement determination unit 86 determines the work implement load torque Tpto using the following equation 5.

$$Tpto = Qwp * Pwp/\eta t \quad \text{Equation 5}$$

Qwp is the displacement volume of the work implement pump. The work implement pump displacement volume Qwp is calculated from the tilt angle detected by the first tilt angle detecting part 33.

The work implement requirement determination unit 86 determines the work implement output flow rate Qwo on the basis of the work implement operation amount Awo. Specifically, the work implement requirement determination unit 86 determines the work implement output flow rate Qwo by multiplying the required flow rate Qdm by a work implement output ratio Rpto. The work implement output ratio Rpto is described below. The control unit 27 controls the discharge capacity of the work implement pump 23 in response to the work implement output flow rate Qwo determined as described above.

Furthermore, the work implement requirement determination unit 86 determines a work implement required engine rotation speed Nedm on the basis of the required flow rate Qdm and the discharge capacity of the work implement pump 23. Specifically, the work implement requirement determination unit 86 determines the work implement required engine rotation speed Nedm on the basis of the required flow rate Qdm, the maximum discharge capacity Qmax of the work implement pump, and the volume efficiency $\eta v$ using the following equation 6.

$$Nedm = Qdm/(Qmax/\eta v) \quad \text{Equation 6}$$

As illustrated in FIG. 12, the control unit 27 has an engine requirement determination unit 87. The engine requirement determination unit 87 determines the engine required power Hdm on the basis of the work implement required power Hpto, the transmission required power Htm, and the energy management required power Hem. The engine requirement determination unit 87 determines the engine required power Hdm by adding together the work implement required power Hpto, the transmission required power Htm, and the energy management required power Hem.

Figure 13:
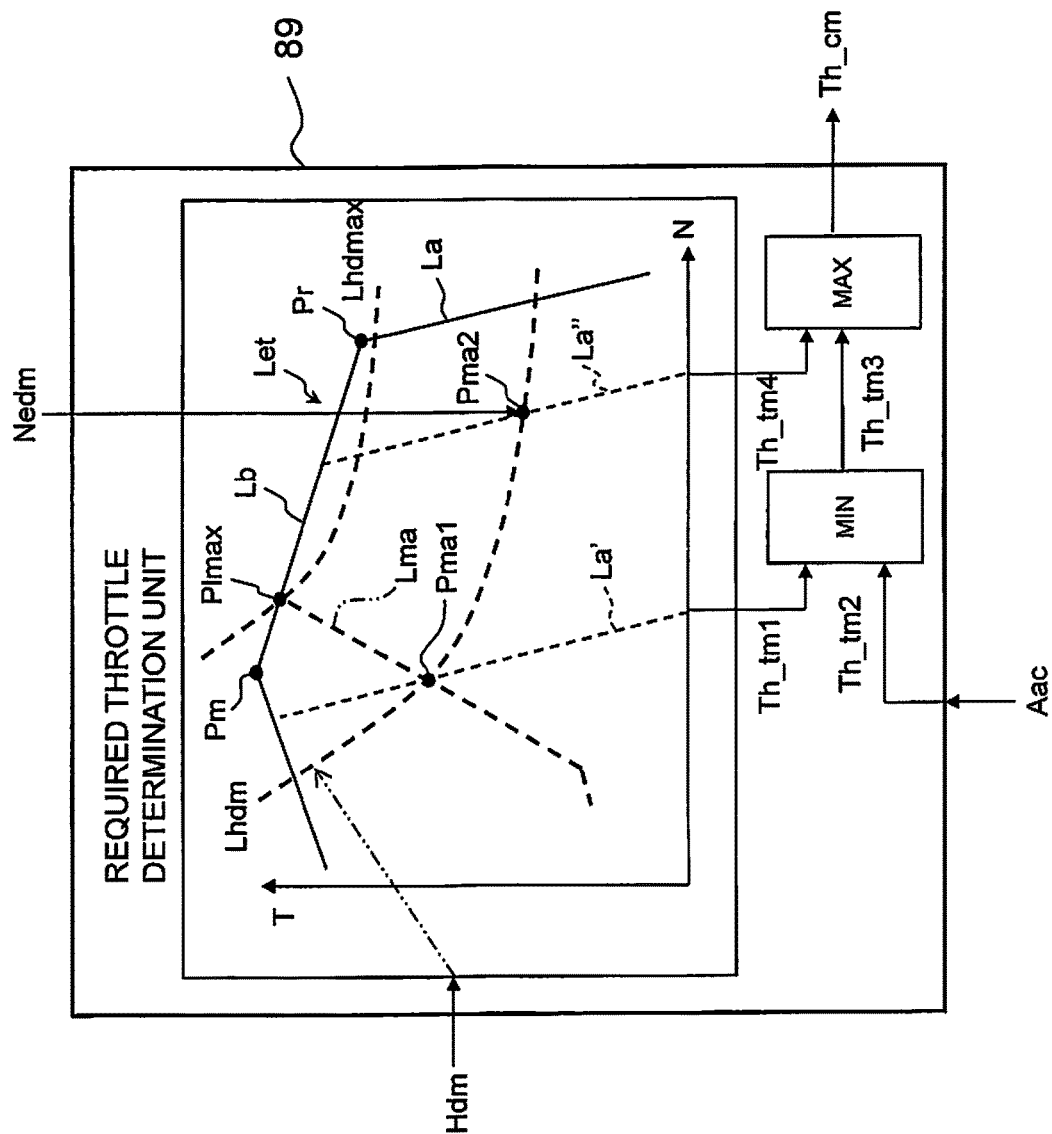
FIG. 13 is a control block diagram illustrating processing executed by the control unit including a required throttle determination unit to determine the command throttle value.

As illustrated in FIG. 13, the control unit 27 has a required throttle determination unit 89. The required throttle determination unit 89 determines the command throttle value Th_cm from the engine required power Hdm, the accelerator operating amount Aac, and the work implement required engine rotation speed Nedm.

Specifically, the storage unit 56 stores an engine torque line Let and a matching line Lma. The engine torque line Let defines the relationship between the output torque of the engine 21 and the engine rotation speed Ne. The engine torque line Let includes the regulation region La and the full load region Lb. The regulation region La changes in response to the command throttle value Th_cm (see La' in FIG. 13). The full load region Lb includes a rated point Pr and a maximum torque point Pm located on the low engine rotation speed side from the rated point Pr.

The matching line Lma is information for determining a first required throttle value Th_tm1 from the engine required power Hdm. While the matching line Lma can be set optionally, the matching line Lma in the present exemplary embodiment is set to pass through a position closer to the maximum torque point Pm than the rated point Pr in the full load region Lb of the engine torque line Let.

The required throttle determination unit 89 determines the first required throttle value Th_tm1 so that the engine torque line Let and the matching line Lma match at a matching point Pma1 where the output torque of the engine 21 becomes the torque corresponding to the engine required power Hdm. That is, the intersection of the matching line Lma and an equivalent power line Lhdm corresponding to the engine required power Hdm is set as a first matching point Pma1, and the required throttle determination unit 89 determines the first required throttle value Th_tm1 so that the regulation region (see La') of the engine torque line Let passes through the first matching point Pma1.

The required throttle determination unit 89 determines the lowest of the first required throttle value Th_tm1 and a second required throttle value Th_tm2 corresponding to the accelerator operating amount Aac, as a third command throttle value Th_tm3. When the work implement operation amount Awo exceeds a predetermined threshold that represents the maximum capacity of the discharge capacity of the work implement pump 23, the required throttle determination unit 89 determines a fourth required throttle value Th_tm4 on the basis of the work implement required engine rotation speed Nedm to increase the speed of the work implement. Specifically, the required throttle determination unit 89 determines the fourth required throttle value Th_tm4 so that the regulation region (see La'') of the engine torque line Let passes through a point Pma2 in which the engine rotation speed on the engine required power Hdm becomes the work implement required engine rotation speed Nedm. The required throttle determination unit 89 determines the largest of the third command throttle value Th_tm3 and the fourth required throttle value Th_tm4 as the command throttle value Th_cm. If the work implement operation amount Awo does not exceed the predetermined threshold, the required throttle determination unit 89 determines the third command throttle value Th_tm3 as the command throttle value Th_cm.

A method for determining the abovementioned transmission output ratio Rtm and the work implement output ratio Rpto will be explained next. As illustrated in FIG. 12, the control unit 27 has a distribution ratio determination unit 88. The distribution ratio determination unit 88 determines the transmission output ratio Rtm and the work implement output ratio Rpto on the basis of the work implement required power Hpto, the transmission required power Htm, the energy management required power Hem, a PTO fixed power Hfix, and a load upper limit power Hmax of the engine 21. The following is an explanation of the load upper limit power Hmax of the engine 21. The PTO fixed power Hfix is a power for driving a hydraulic pump for auxiliary equipment and includes, for example, power distributed to the steering pump 40 and/or the transmission pump 29.

Alternatively, when the work vehicle 1 is provided with a cooling fan for cooling the engine 21, a fan motor for driving the cooling fan, and a fan pump for driving the fan motor, the hydraulic pump for auxiliary equipment may include the fan pump. In this case, the PTO fixed power Hfix may include the power for driving the fan pump. Moreover, the PTO fixed power Hfix may include power for lubrication. The PTO fixed power Hfix is determined on the basis of the engine rotation speed and the operation amount of the steering operating member 57a and the like.

The output power from the engine 21 is distributed to the hydraulic pumps, such as the work implement pump 23, and to the power transmission device 24 by the PTO 22. The output power for the power transmission device 24 is distributed between the power for the tractive force of the power transmission device 24 and the power for the charging to the capacitor 64. However, when the sum of the work implement required power Hpto, the transmission required power Htm, and the energy management required power Hem is greater than the output power from the engine 21, the output power from the engine 21 cannot be distributed according to each of the requirement values. As a result, the sum of the requirement values is limited so as not to exceed the output power from the engine 21 by multiplying the work implement required power Hpto and the transmission required power Htm by the respective output ratios Rpto and Rtm.

Specifically, when the sum of the work implement required power Hpto, the transmission required power Htm, the energy management required power Hem, and the PTO fixed power Hfix is equal to or less than the load upper limit power Hmax, the transmission output ratio Rtm and the work implement output ratio Rpto are each set to "1." That is, the output power from the engine 21 is distributed according to each of the requirement values of the work implement required power Hpto, the transmission required power Htm, and the energy management required power Hem. When the sum of the work implement required power Hpto, the transmission required power Htm, the energy management required power Hem, and the PTO fixed power Hfix is greater than the load upper limit power Hmax, at least one of the transmission output ratio Rtm and the work implement output ratio Rpto is set to a value less than "1."

The load upper limit power Hmax of the engine 21 is determined on the basis of the current engine rotation speed Ne when the engine rotation speed Ne is less than the first rotation speed Ne_th. Specifically, the load upper limit power Hmax is determined from the above-mentioned upper limit target input torque Max_Te+Tpto and the current engine rotation speed Ne as illustrated in FIG. 10. That is, the load upper limit power Hmax is calculated on the basis of the torque value of the upper limit target input torque Max_Te+Tpto at the current engine rotation speed Ne. When the engine rotation speed Ne is set as the work implement required engine rotation speed Nedm due to the abovementioned engine rotation control (see FIG. 13), the engine rotation speed Ne exceeds the first rotation speed Ne_th. In this case, a load upper limit power Hplmax at the maximum matching point Plmax is considered as the load upper limit power Hmax of the engine 21. As illustrated in FIG. 10, while the engine rotation speed Ne is in a range exceeding the first rotation speed Ne_th, the torque in the full load region Lb multiplied by the engine rotation speed Ne exceeds the load upper limit power Hplmax at the maximum matching point Plmax. Therefore, engine stall will not occur even if the load upper limit power Hplmax at the maximum matching point Plmax is considered as the load upper limit power Hmax.

Next, the distribution ratio determination unit 88 determines a preferential distribution power Hprior according to equation 7.

$$Hprior = Hem + Hfix \qquad \text{Equation 7}$$

The distribution ratio determination unit 88 then determines a distributable power Hdiv that the calculated preferential distribution power Hprior subtracted from the load upper limit power Hmax leaves. The distributable power is represented as in equation 8.

$$Hdiv = \text{Max}(0, Hmax - Hprior) \qquad \text{Equation 8}$$

Here, Max (A, B) represents the larger of A and B.

Figure 14:
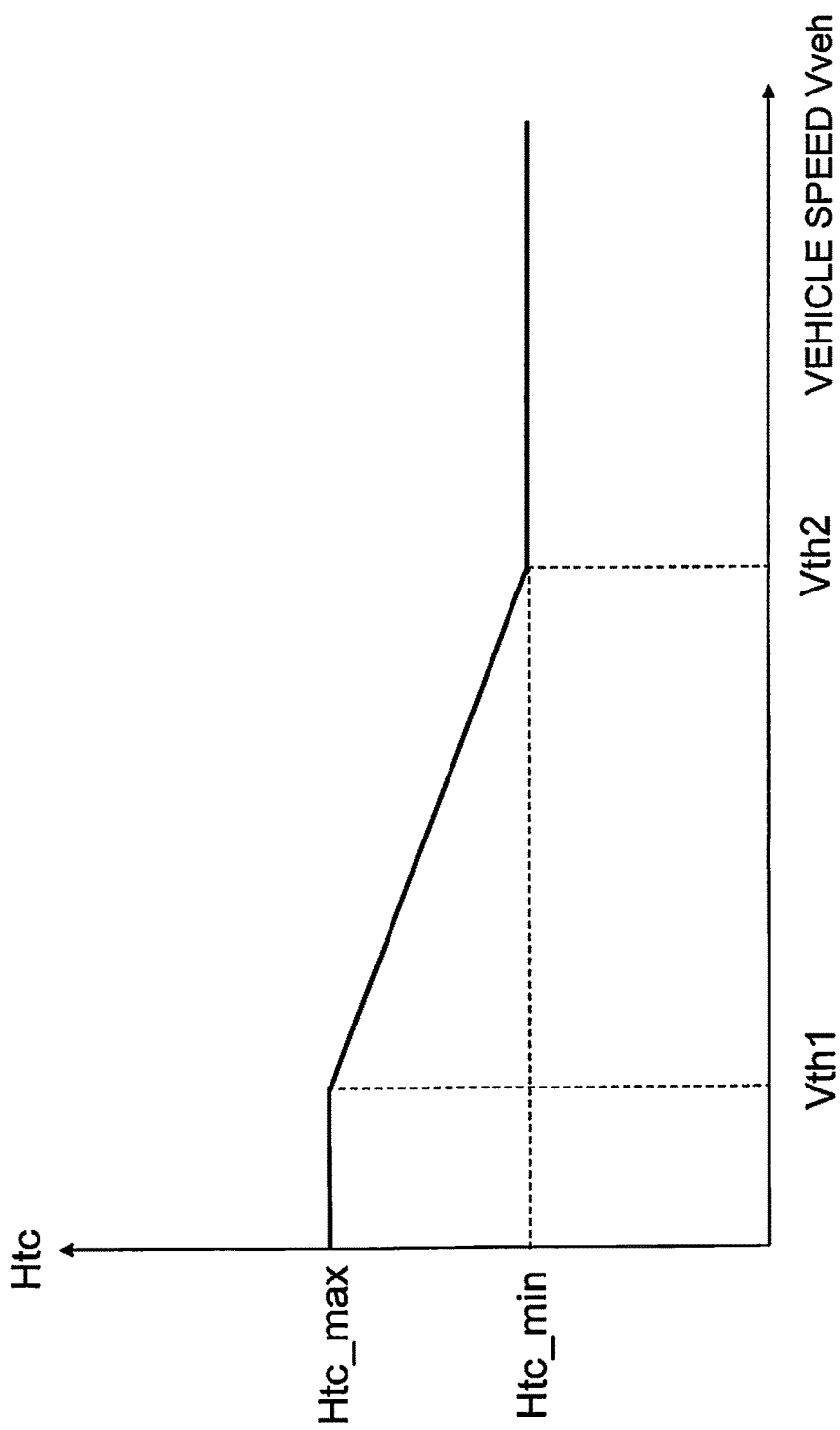
FIG. 14 illustrates changes in a transmission compensation power with respect to the vehicle speed.

Next, a transmission compensation power Htc is calculated. The transmission compensation power Htc simulates the absorption power of a torque converter. The absorption torque of the torque converter is proportional to a primary torque coefficient determined from a ratio between the input rotation speed and the output rotation speed of the torque converter and to the square of the input rotation speed of the torque converter. Therefore, when there is no driving of the work implement and the work vehicle is traveling at a fixed vehicle speed, the absorption power of the torque converter increases in correspondence to an increase in the engine rotation speed. In other words, the absorption power decreases and the power allocated to the work implement increases in correspondence to an increase in the vehicle speed even at the same engine rotation speed. Therefore, if it is assumed that a load on the work implement increases while the vehicle is traveling at a fixed vehicle speed, the engine rotation speed gradually falls and the absorption power decreases. The transmission compensation power Htc is simulated as in FIG. 14 in consideration of the above property of the torque converter. FIG. 14 illustrates changes in a transmission compensation power with respect to the vehicle speed.

The vehicle speed Vveh in FIG. 14 is calculated from the output rotation speed Nout. When the absolute value of the vehicle speed Vveh is in the range from zero up to an including a first speed Vth1, the transmission compensation power Htc is a first power Htc_max. When the absolute value of the vehicle speed Vveh is equal to or greater than a second speed Vth2, the transmission compensation power Htc is a second power Htc_min. The first power Htc_max and the second power Htc_min are fixed values and previously stored in the storage unit 56. The second power Htc_min is smaller than the first power Htc_max. The first speed Vth1 and the second speed Vth2 are set in response to a variable speed level detected by the shift operation detecting unit 53b. The first speed Vth1 and the second speed Vth2 are described in detail below.

When the absolute value of the vehicle speed Vveh is in the range from the first speed Vth1 up to the second speed Vth2, the transmission compensation power Htc is represented by the following equation 9.

$$Htc = Htc\_\max - (Htc\_\max - Htc\_\min)/(Vth2 - Vth1) * (|Vveh| - Vth1) \qquad \text{Equation 9}$$

That is, when the absolute value of the vehicle speed Vveh is in the range from the first speed Vth1 up to the second speed Vth2, the transmission compensation power Htc becomes increasingly smaller than the first power Htc_max as the absolute value of the vehicle speed Vveh increases.

A method for setting the first speed Vth1 and the second speed Vth2 will be explained next. The first speed Vth1 and the second speed Vth2 are respective products of predetermined initial values Vth1_org and Vth2_org (where Vth2_org > Vth1_org) multiplied by a coefficient Km (m is a natural number, and m=1 at the first speed, m=2 at the second speed, and so on) corresponding to the variable speed level. Specifically, the first speed Vth1 and the second speed Vth2 are represented by the following equation 10.

$$Vth1 = Km * Vth1\_org$$

$$Vth2 = Km * Vth1\_org \qquad \text{Equation 10}$$

Here, the coefficient Km increases in correspondence to an increase in the level number m of the variable speed level. Specifically, the coefficient K2 at the second speed is greater than the coefficient K1 at the first speed. The coefficient K3 at the third speed is greater than the coefficient K2 at the second speed. The coefficient K4 at the fourth speed is greater than the coefficient K3 at the third speed.

Next, the distribution ratio determination unit 88 carries out the following processing when the load upper limit power Hmax of the engine 21 is the load upper limit power Hplmax at the maximum matching point Plmax, that is, when the engine rotation speed Ne is equal to or greater than the first rotation speed Ne_th and the sum of the work implement required power Hpto and the transmission required power Htm is greater than the distributable power Hdiv.

The distribution ratio determination unit 88 first calculates a transmission preferential distribution power Htpa in accordance with the following equation 11.

$$Htpa = \text{Min}(Hdiv, Htm, Htc) \qquad \text{Equation 11}$$

Here, Min (A, B, C) represents the smallest value among A, B, and C. When Min (A, B) is indicated in the following explanation, Min (A, B) represents the smallest value among A and B.

The transmission preferential distribution power Htpa is allocated to the power transmission device 24. That is, the distribution ratio determination unit 88 allocates the smaller of the transmission compensation power Htc and the transmission required power Htm to the power transmission device 24.

Next, the distribution ratio determination unit 88 calculates a work implement allocation power Hla in accordance with the following equation 12.

$$Hla = \text{Min}(Hdiv - Htpa, Hpto) \qquad \text{Equation 12}$$

The distribution ratio determination unit 88 then calculates a transmission addition distribution power Htaa in accordance with the following equation 13.

$$Htaa = \text{Min}(Hdiv - Htpa - Hla, Htm - Htpa) \qquad \text{Equation 13}$$

The distribution ratio determination unit 88 finally calculates a transmission allocation power Hta in accordance with the following equation 14.

$$Hta = Htpa + Htaa \qquad \text{Equation 14}$$

As described above, the distribution ratio determination unit 88 distributes, to the work implement pump 23 and the power transmission device 24, the power Hdiv−Min (Htc, Htm) which is the power resulting from excluding the smaller of the transmission compensation power Htc and the transmission required power Htm from the distributable power Hdiv. Consequently, the distribution ratio determination unit 88 determines the work implement allocation power Hla allocated to the work implement pump 23 and the transmission allocation power Hta allocated to the power transmission device 24. The distribution ratio determination unit 88 also determines the work implement allocation power Hla before determining the transmission allocation power Hta. Therefore, the distribution ratio determination unit 88 preferentially allocates the power Hdiv−Min (Htc, Htm) remaining from the distributable power to the work implement pump 23 before the power transmission device 24 so that the work implement required power Hpto can be preferentially secured.

Finally, the distribution ratio determination unit 88 determines the transmission output ratio Rtm and the work implement output ratio Rpto according to the following equation 15.

$$Rtm = Hta/Htm$$

$$Rpto = Hla/Hpto \quad \text{Equation 15}$$

Figure 15:
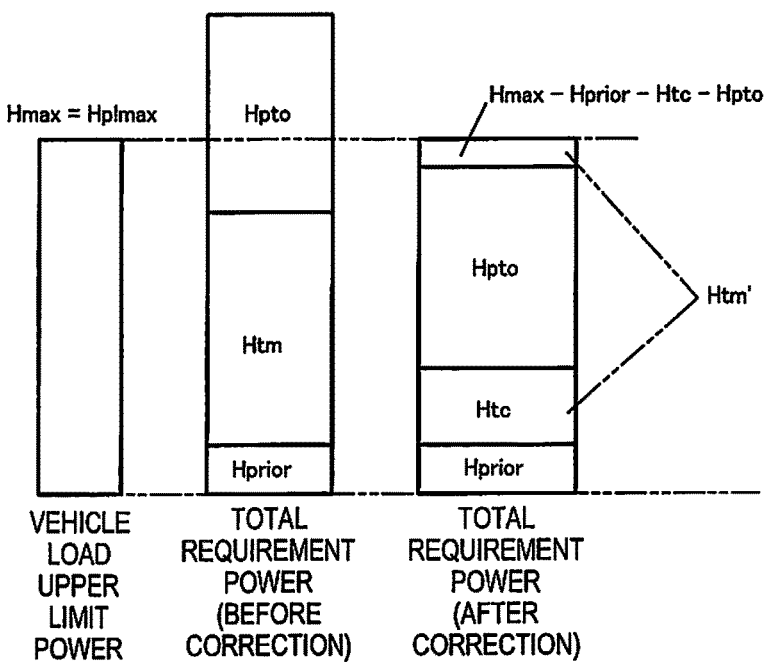
FIG. 15 illustrates a method for distributing output power from an engine in a first illustrative example.

Next, the operations of the distribution ratio determination unit 88 will be explained on the basis of a specific example. For example, as illustrated in FIG. 15, when the sum of the preferential distribution power Hprior, the work implement required power Hpto, and the transmission required power Htm (Hprior+Hpto+Htm) is greater than the load upper limit power Hmax but the sum of the preferential distribution power Hprior, the work implement required power Hpto, and the transmission compensation power Htc (however, the transmission compensation power Htc is smaller than the transmission required power Htm) is less than the load upper limit power Hmax, the transmission required power Htm is corrected to Htm' which is less than Htm so that the above sums are no greater than the load upper limit power Hmax. The ratio of the transmission required power Htm' (the driving power actually supplied from the engine 21 to the power transmission device 24) after correction with respect to the transmission required power Htm before correction is determined as the transmission output ratio Rtm. In this case, the work implement output ratio Rpto is set to "1."

Next, the distribution ratio determination unit 88 carries out the following processing when the load upper limit power Hmax of the engine 21 is less than the load upper limit power Hplmax at the maximum matching point Plmax, that is, when the engine rotation speed Ne is less than the first rotation speed Ne_th and the sum of the work implement required power Hpto and the transmission required power Htm is greater than the distributable power Hdiv.

Similarly, the distribution ratio determination unit 88 determines the distributable power Hdiv and the transmission compensation power Htc on the basis of equations 8 to 10. Next, the distribution ratio determination unit 88 assumes that the load upper limit power Hmax of the engine 21 is the load upper limit power Hplmax at the maximum matching point Plmax and calculates a temporary work implement allocation power Hla_tmp and a temporary transmission allocation power Hta_tmp in accordance with the equations 11 to 15.

The distribution ratio determination unit 88 then calculates a second transmission preferential distribution power Htpa2 in accordance with the following equation 16.

$$Htpa2 = \text{Min}(Hcrp, Htm) \quad \text{Equation 16}$$

Here, Hcrp represents a creep power. The creep power Hcrp is a power required by the power transmission device 24 for enabling the work vehicle to perform creeping. Specifically, the creep power Hcrp is the minimum power required for the work vehicle 1 to travel.

The second transmission preferential distribution power Htpa2 is allocated to the power transmission device 24. That is, the distribution ratio determination unit 88 allocates the smaller of the creep power Hcrp and the transmission required power Htm to the power transmission device 24.

Next, the distribution ratio determination unit 88 calculates a work implement proportional allocation power Hla_prop in accordance with the following equation 17.

$$Hla\_prop = Hdiv \ast Hta\_tmp/(Hla\_tmp + Hta\_tmp) \quad \text{Equation 17}$$

The distribution ratio determination unit 88 then determines the work implement proportional allocation power Hla_prop so that the ratio of the temporary transmission allocation power Hta_tmp with respect to the temporary work implement allocation power Hla_tmp and the ratio of a transmission proportional allocation power Hta_prop with respect to the work implement proportional allocation power Hla_prop are equal and so that the sum of the work implement proportional allocation power Hla_prop and the transmission proportional allocation power Hta_prop becomes the distributable power Hdiv.

Next, a second work implement allocation power Hla2 is calculated according to the following equation 18.

$$Hla2 = \text{Min}(\text{Max}(Hdiv - Htpa2, 0), Hpto, Hla\_prop) \quad \text{Equation 18}$$

The distribution ratio determination unit 88 then calculates a second transmission addition distribution power Htaa2 in accordance with the following equation 19.

$$Htaa2 = \text{Min}(\text{Max}(Hdiv - Htpa2 - Hla2, 0), Htm - Htpa2) \quad \text{Equation 19}$$

The distribution ratio determination unit 88 finally calculates a second transmission allocation power Hta2 in accordance with the following equation 20.

$$Hta2 = Htpa2 + Htaa2 \quad \text{Equation 20}$$

As described above, the distribution ratio determination unit 88 distributes, to the work implement pump 23 and the power transmission device 24, the power Hdiv−Min (Hcrp, Htm) which is the power resulting from excluding the smaller of the creep power Hcrp and the transmission required power Htm from the distributable power Hdiv. Consequently, the distribution ratio determination unit 88 determines the second work implement allocation power Hla2 allocated to the work implement pump 23 and the second transmission allocation power Hta2 allocated to the power transmission device 24. The distribution ratio determination unit 88 also determines the second work implement allocation power Hla2 before determining the second transmission allocation power Hta2. Therefore, the distribution ratio determination unit 88 preferentially allocates the power Hdiv−Min (Hcrp, Htm) remaining from the distributable power to the work implement pump 23 before the power transmission device 24 so that the smaller of the work implement required power Hpto and the work implement proportional allocation power Hla_prop can be preferentially secured.

Finally, the distribution ratio determination unit 88 determines the transmission output ratio Rtm and the work implement output ratio Rpto in accordance with the following equation 21.

$$Rtm = Hta2/Htm$$

$$Rpto = Hla2/Hpto \quad \text{Equation 21}$$

Figure 16:
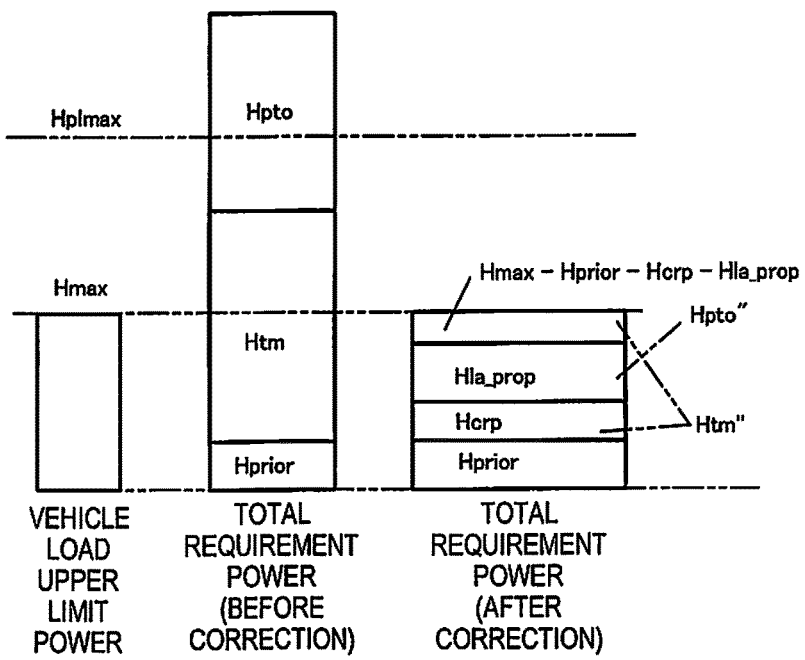
FIG. 16 illustrates a method for distributing output power from the engine in a second illustrative example.

Next, the operations of the distribution ratio determination unit 88 will be explained on the basis of a specific example. For example as illustrated in FIG. 16, when the sum of the preferential distribution power Hprior, the work implement required power Hpto, and the transmission required power Htm (Hprior+Hpto+Htm) is greater than the load upper limit power Hmax but the sum of the preferential distribution power Hprior, the work implement proportional allocation power Hla_prop (however, the work implement proportional allocation power Hla_prop is less than the work implement required power Hpto), and the creep power Hcrp (however, the creep power is less than the transmission required power Htm) is less than the load upper limit power Hmax, the transmission required power Htm is corrected to Htm''' which is less than Htm and the work implement required power Hpto is corrected to Hpto" which is less than Hpto so that the above sums are no greater than the load upper limit power Hmax. The ratio of the transmission required power Htm" (the driving power actually supplied from the engine 21 to the power transmission device 24) after correction with respect to the transmission required power Htm before correction is determined as the transmission output ratio Rtm. Moreover, the ratio of the work implement required power Hpto" (the driving power actually supplied from the engine 21 to the work implement pump 23) after correction with respect to the work implement required power Hpto before correction is determined as the work implement output ratio Rpto.

The work vehicle 1 according to the present embodiment has the following features. When the driving power of the engine 21 is less than the entire required power of the work vehicle 1 and the transmission required power Htm is greater than the transmission compensation power Htc, the control unit 27 (distribution ratio determination unit 88) preferentially allocates the transmission compensation power Htc to the power transmission device 24. The transmission compensation power Htc simulates the power absorbed by a torque converter. Therefore, the control unit 27 is able to distribute the driving power from the engine 21 to the driving power for traveling the vehicle and the driving power for the work implement with a method that is similar to a work vehicle equipped with a torque converter-type transmission.

The control unit 27 (distribution ratio determination unit 88) preferentially allocates the transmission compensation power Htc to the power transmission device 24 and preferentially allocates the power Hdiv−Min (Htc, Htm) remaining from the distributable power to the work implement pump 23 before the power transmission device 24 so that the work implement required power Hpto can be preferentially secured. A work vehicle having a torque converter-type transmission requires time for accelerating after stopping the operation of the work implement. This is because the engine rotation speed drops due to the driving power of the engine being split with the work implement when the work implement is being operated, and then time is required thereafter for the engine rotation speed to rise in order to generate tractive force during acceleration. However, the work vehicle 1 enables the quick allocation of the driving power corresponding to the work implement required power Hpto to the power transmission device 24 even if the work implement required power Hpto falls quickly. Therefore, the actuation of the travelling apparatus 25 can be realized in a way that allows the operating intention of the operator to be reflected as quickly as possible.

When the rotation speed Ne of the engine 21 is less than the first rotation speed Neth, the load upper limit power Hmax of the engine 21 becomes smaller than the power Hplmax at the maximum matching point Plmax. In this way, even if the load upper limit power Hmax is small, the control unit 27 (distribution ratio determination unit 88) preferentially allocates the creep power Hcrp to the power transmission device 24. The creep power Hcrp is the minimum power required for the work vehicle 1 to travel. Therefore, when the load upper limit power Hmax is small, the control unit 27 secures the supply of the minimum power required for the work vehicle 1 to travel to the power transmission device 24 while being able to distribute the driving power from the engine 21 to the driving power for the vehicle to travel and to the driving power for the work implement. Even in this case, the work vehicle 1 enables the quick allocation of the driving power corresponding to the work implement required power Hpto" after correction to the power transmission device 24 even if the work implement required power Hpto falls quickly. Therefore, the actuation of the travelling apparatus 25 can be realized in a way that allows the operating intention of the operator on the work implement 3 to be reflected as quickly as possible.

The control unit 27 (distribution ratio determination unit 88) preferentially allocates the creep power Hcrp to the power transmission device 24 and preferentially allocates the power Hdiv−Min (Hcrp, Htm) remaining from the distributable power to the work implement pump 23 before the power transmission device 24 so that the smaller of the work implement required power Hpto and the work implement proportional allocation power Hla_prop can be preferentially secured. As a result, even if the load upper limit power Hmax of the engine 21 is small in the work vehicle 1, the load upper limit power Hmax can be distributed with as good a balance as possible to the power transmission device 24 and the work implement pump 23. Therefore, the actuation of the work implement 3 can be realized in a way that allows the operating intention of the operator on the work implement 3 to be reflected as quickly as possible.

The preferential distribution power Hprior includes the energy management required power Hem. Therefore, charging of the capacitor 64 is performed preferentially. Therefore, energy management is carried out in a stable manner in the work vehicle 1 equipped with the EMT transmission.

The transmission compensation power Htc is the first power Htc_max when the absolute value of the vehicle speed Vveh is in the range from zero up to the first speed Vth1, and falls further below the first power Htc_max as the absolute value of the vehicle speed Vveh increases when the absolute value of the vehicle speed Vveh is in the range from the first speed Vth1 up to the second speed Vth2, and the transmission compensation power Htc is the second power Htc_min when the absolute value of the vehicle speed Vveh is equal to or greater than the second speed Vth2. Therefore, when the engine rotation speed is the same, the transmission compensation power Htc is simulated in accordance with the properties of the absorption power of a torque converter so that the absorption power decreases and the power allocated to the work implement increases as the vehicle speed increases.

The first speed Vth1 and the second speed Vth2 are set to larger values as the variable speed level detected by the shift operation detecting unit 53b increases. When the variable speed level is large, the speed ratio is set so that the ratio of the output rotation speed Nout with respect to the engine rotation speed Ne increases in the power transmission device 24. The changes in the first speed Vth1 and the second speed Vth2 with respect to the variable speed level as described above corresponds to changes in the speed ratio thereof.

The control unit 27 is able to obtain the desired input torque for the power transmission device 24 and the desired output torque from the power transmission device 24 by determining the command torques Tm1_ref and Tm2_ref to the motors MG1 and MG2 from the balance of the torques of the power transmission device 24. As a result, predetermined tractive force characteristics in particular can be obtained accurately in the work vehicle 1 equipped with an EMT or HMT transmission. Generally, a work vehicle is required to conduct work while the tractive force and the loads on the work implement fluctuate greatly. Therefore, the ability to adjust the input torque and the output torque to the power transmission device to desired values is desirable to obtain a balance between the driving power and the operation of the work implement. By adjusting the target input torque Te_ref and the target output torque To_ref in the work vehicle 1 according to the present exemplary embodiment, the desired input torque to the power transmission device 24 and the desired output torque from the power transmission device 24 can be obtained. As a result, a work vehicle combining both operability and drivability can be realized.

The present invention is not limited to the above exemplary embodiments and various changes and modifications may be made without departing from the spirit of the invention.

The present invention is not limited to the above-mentioned wheel loader and may be applied to another type of work vehicle, such as a bulldozer, a tractor, a forklift, or a motor grader.

The present invention may be applicable to another type of transmission, such as a HMT, without being limited to the EMT. In this case, the first motor MG1 functions as a hydraulic motor and a hydraulic pump. The second motor MG2 functions as a hydraulic motor and a hydraulic pump. The first motor MG1 and the second motor MG2 are variable capacitor pump/motors, and the capacities are controlled by the control unit 27 controlling the tilt angle of the skew plate or the inclined shaft. The capacities of the first motor MG1 and the second motor MG2 are controlled so that the command torques Tm1_ref and Tm2_ref calculated in the same way as in the above embodiments are outputted.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. However, the number of the planetary gear mechanisms provided in the power transmission device 24 is not limited to two. The power transmission device 24 may only have one planetary gear mechanism. Alternatively, the power transmission device 24 may have three or more planetary gear mechanisms.

The torque-balance information is not limited to the equations for balancing the torque as in the above exemplary embodiment. For example, the torque-balance information may be in the format of a table or a map. The torque-balance information is not limited to the above-mentioned two types of torque-balance information including the first torque-balance information and the second torque-balance information. Three or more types of torque-balance information may be used in combination with a selectable number of modes in the power transmission device 24 when the driving power drivetrain of the power transmission device 24 has three or more modes. Alternatively, only one torque-balance information may be used when there is only one driving power drivetrain for the power transmission device 24.

The shift operating member 53a may have a kick-down switch. A kick-down switch is an operating member for lowering the speed range of the power transmission device 24 by one stage or a plurality of stages from the current speed range. The operator is able to lower the speed range of the power transmission device 24 from the current speed range to a low-speed speed range by operating the kick-down switch.

The model of the transmission compensation power Htc is not limited to the model depicted in FIG. 14. Another model of the transmission compensation power Htc may be used so long as the model is based on the properties of a torque converter in which the absorption torque of a torque converter is determined from a ratio of the input rotation speed and the output rotation speed of the torque converter.

Figure 17:
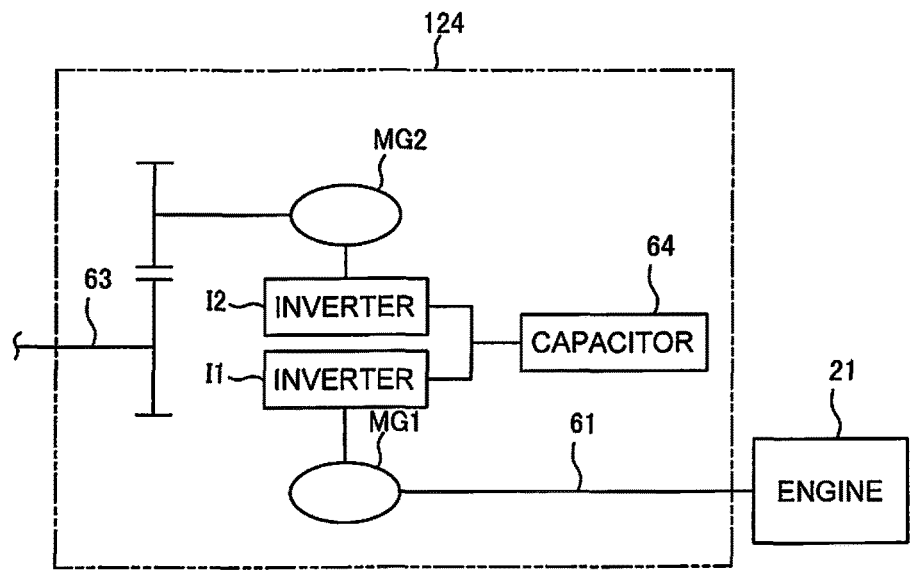
FIG. 17 is a schematic view illustrating a power transmission device according to a first modified example.

The power transmission device is not limited to a so-called split system device using the planetary gear mechanism as described above, and may use a device of another system. For example, FIG. 17 is a schematic view illustrating a power transmission device 124 according to a modified example. The power transmission device 124 illustrated in FIG. 17 is a so-called series system power transmission device. The engine 21 in the power transmission device 124 only uses the first motor MG1 to generate electricity. The second motor MG2 uses the electrical power generated in the first motor MG1 to drive the travelling apparatus. The second motor MG2 also generates electricity by recovering energy during deceleration.

Figure 18:
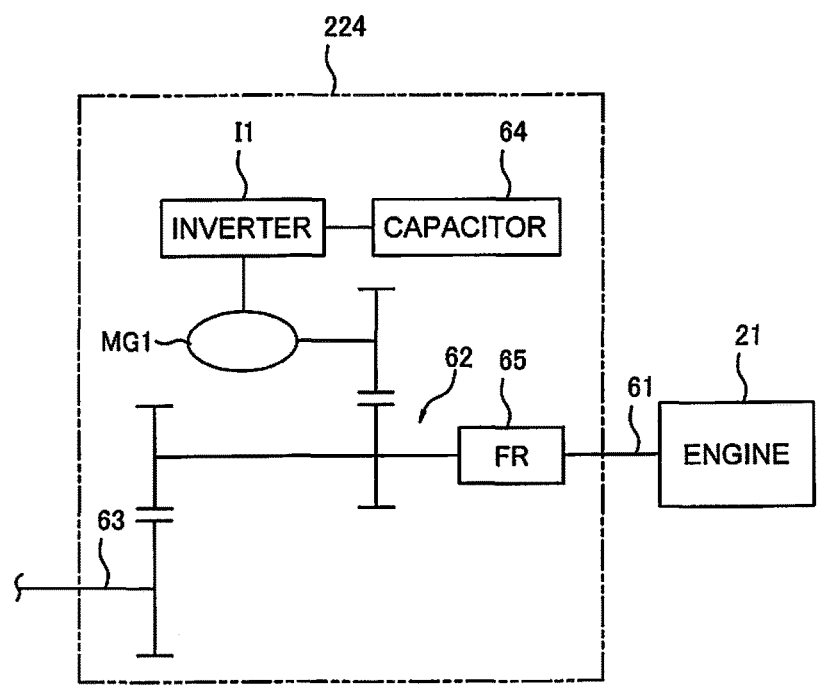
FIG. 18 is a schematic view illustrating a power transmission device according to a second modified example.

Alternatively, a parallel system power transmission device 224 as illustrated in FIG. 18 may be used. FIG. 18 is a schematic view illustrating a power transmission device 224 according to a second modified example. The driving power of the engine 21 in the power transmission device 224 is transmitted via the gear mechanism 62 to the output shaft 63. The output shaft 63 is driven by driving power from the motor MG1. The motor MG1 generates electricity by regenerating energy during deceleration.

Figure 19:
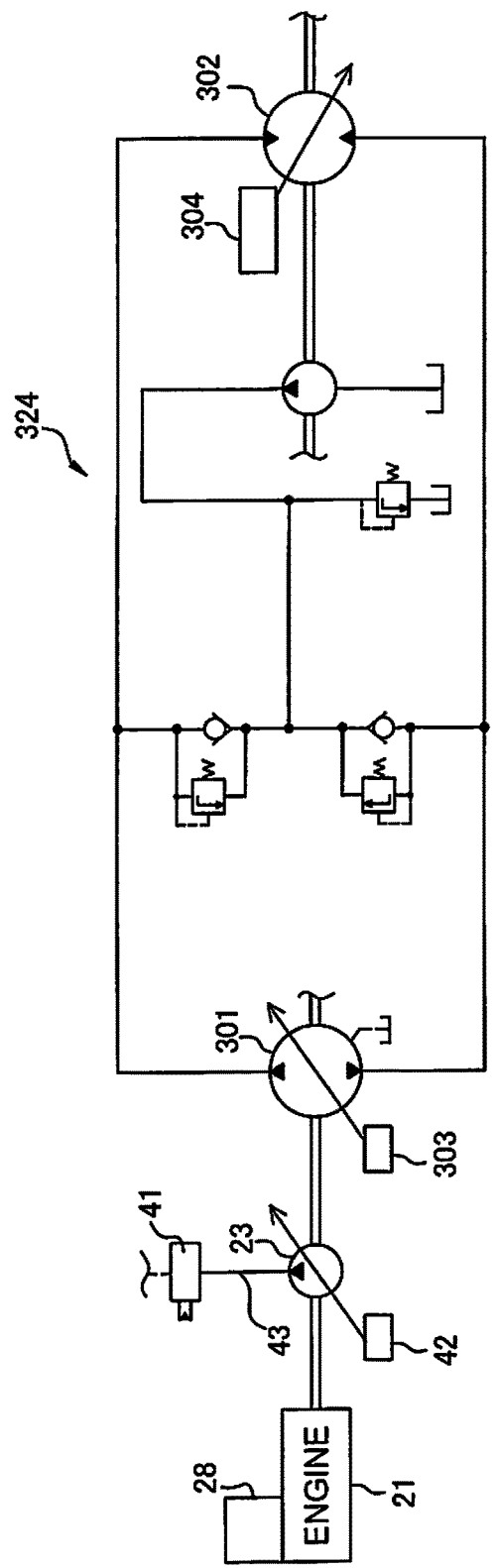
FIG. 19 is a schematic view illustrating a power transmission device according to a third modified example.

Alternatively, the power transmission device is not limited to a so-called hybrid power transmission device that uses the motors as described above. For example, FIG. 19 is a schematic view illustrating a power transmission device 324 according to a third modified example. The power transmission device 324 is a so-called hydro-static transmission (HST) device. The power transmission device 324 has a travel pump 301 and a travel motor 302. The travel pump 301 is driven by the engine 21. The travel pump 301 is a variable capacity hydraulic pump and the capacity of the travel pump 301 is controlled by a pump capacity control device 303. The travel motor 302 drives the travelling apparatus by being driven by hydraulic fluid discharged from the travel pump 301. The travel motor 302 is a variable capacity hydraulic motor and the capacity of the travel motor 302 is controlled by a motor capacity control device 304. The vehicle speed and the tractive force are controlled by controlling the engine rotation speed, the capacity of the travel pump 301, and the capacity of the travel motor 302 and the like.

Configurations that are the same in the above exemplary embodiment are provided with the same reference numerals in FIGS. 17, 18 and 19 and explanations thereof are omitted.

When the transmission of the work vehicle 1 is an HST or an HMT, the work vehicle 1 may not have the inverters I1 or I2, the capacitor 64, or the energy management requirement determination unit 85. Therefore, the preferential distribution power Hprior may not include the energy management required power Hem.

The exemplary embodiments of the present invention are able to demonstrate the effect of being able to distribute the driving power from the engine to driving power for traveling the vehicle and to driving power for the work implement with a method that is similar to that of a work vehicle equipped with a torque converter-type transmission. Therefore, the exemplary embodiments of the present invention are useful as a work vehicle equipped with a transmission, such as a HMT, an EMT, or a HST, and as a work vehicle control method.

What is claimed is:

1. A work vehicle comprising:
   an engine;
   a work implement pump driven by the engine;
   a work implement driven by hydraulic fluid discharged from the work implement pump;
   a travelling apparatus driven by the engine;
   a power transmission device including an input shaft for inputting driving power from the engine, an output shaft for outputting driving power transmitted to the travelling apparatus, and a motor;
   a vehicle speed detecting unit configured to detect a vehicle speed;
   a work implement pump pressure detecting unit configured to detect a work implement pump pressure of the work implement pump;
   a work implement operating member for operating the work implement;
   a work implement operation detecting unit configured to detect an operation amount of the work implement operating member;
   an accelerator operating member;
   an accelerator operation detecting unit configured to detect an operation amount of the accelerator operating member; and
   a control unit configured to control the power transmission device;
   the power transmission device being configured so that a rotation speed ratio of the output shaft with respect to the input shaft is changed by changing the rotation speed of the motor;
   the control unit including
      a work implement requirement determination unit configured to determine a work implement required power on the basis of an operation amount of the work implement operating member and the work implement pump pressure;
      a transmission requirement determination unit configured to determine a transmission required power on the basis of the vehicle speed and the operation amount of the accelerator operating member; and
      a distribution ratio determination unit configured to determine a transmission output ratio that is a value derived by dividing the driving power actually supplied from the engine to the power transmission device by the transmission required power, and a work implement output ratio that is a value derived by dividing the driving power actually supplied from the engine to the work implement pump by the work implement required power,
   in a first case
      in which the engine rotates at a rotation speed equal to or greater than a first rotation speed that is the rotation speed of the engine at a maximum matching point where an upper limit target input torque line and an engine torque line intersect and
      in which the sum of the work implement required power and the transmission required power is greater than a first distributable power that a predetermined preferential distribution power subtracted from a load upper limit power of the engine at the first rotation speed leaves,
   the distribution ratio determination unit is configured to allocate the smaller of a transmission compensation power and the transmission required power to the power transmission device and distribute the remainder of the first distributable power to the work implement pump and to the power transmission device, thereby determining a first work implement allocation power allocated to the work implement pump and a first transmission allocation power allocated to the power transmission device.

2. The work vehicle according to claim 1, wherein
   the distribution ratio determination unit is configured to preferentially allocate the remainder of the first distributable power to the work implement pump over the power transmission device to be able to preferentially secure the work implement required power in the first case.

3. The work vehicle according to claim 1, wherein
   when the engine rotates at a second rotation speed lower than the first rotation speed, the load upper limit power of the engine at the second rotation speed is calculated on the basis of a torque value of the upper limit target input torque line at the second rotation speed; and
   in a second case
      in which the engine rotates at the second rotation speed and
      in which the sum of the work implement required power and the transmission required power is greater than a second distributable power that the preferential distribution power subtracted from the load upper limit power of the engine at the second rotation speed leaves,
   the distribution ratio determination unit is configured to allocate the smaller of a creep power and the transmission required power to the power transmission device, the creep power being required by the power transmission device so that the work vehicle travels at the minimum speed, and to distribute the remainder of the second distributable power to the work implement pump and to the power transmission device, thereby determining a second work implement allocation power allocated to the work implement pump and a second transmission allocation power allocated to the power transmission device.

4. The work according to claim 3, wherein
   in the second case, the distribution ratio determination unit is configured to
      determine the first work implement allocation power and the first transmission allocation power, assuming a case in which the engine rotates at the first rotation speed;
      determine a work implement proportional allocation power so that the ratio of the first transmission allocation power with respect to the first work implement allocation power and the ratio of a transmission proportional allocation power with respect to a work implement proportional allocation power are equal and so that a sum of the work implement proportional allocation power and the transmission proportional allocation power is equal to the second distributable power; and
      preferentially allocate the remainder of the second distributable power to the work implement pump over the power transmission device to be able to preferentially secure the smaller of the work implement required power and the work implement proportional allocation power.

5. The work vehicle according to claim 1, further comprising
an energy reservoir for storing energy generated in the motor;
the control unit further including an energy management requirement determination unit for determining an energy management required power on the basis of a remaining amount of energy in the energy reservoir, and
the preferential distribution power including the energy management required power.

6. The work vehicle according to claim 1, wherein
the transmission compensation power is a predetermined first power while an absolute value of the vehicle speed is in a range from zero up to a first speed;
the transmission compensation power becomes correspondingly smaller than the first power as the absolute value of the vehicle speed increases while an absolute value of the vehicle speed is in a range from the first speed up to a second speed greater than the first speed; and
the transmission compensation power is a predetermined second power smaller than the first power when the absolute value of the vehicle speed is equal to or greater than the second speed.

7. The work vehicle according to claim 6, further comprising
a shift operating member; and
a shift operation detecting unit configured to detect a position of the shift operating member;
the first speed and the second speed being set in response to a variable speed level detected by the shift operation detecting unit.

8. The work vehicle according to claim 1, wherein
the control unit further includes
a target-input-torque determination unit configured to determine a target input torque that is a torque target value inputted to the power transmission device;
a target-output-torque determination unit configured to determine a target output torque which is a torque target value outputted from the power transmission device;
a storage unit configured to store torque-balance information defining a relationship between the target input torque and the target output torque to achieve a balance of the torques in the power transmission device; and
a command-torque determination unit configured to use the torque-balance information to determine a command torque for the motor from the target input torque and the target output torque.

9. A control method for a work vehicle,
the work vehicle being equipped with an engine; a work implement pump driven by the engine; a work implement driven by hydraulic fluid discharged from the work implement pump; a travelling apparatus driven by the engine; a power transmission device including an input shaft for inputting driving power from the engine, an output shaft for outputting driving power transmitted to the travelling apparatus, and a motor; a vehicle speed detecting unit configured to detect a vehicle speed; a work implement pump pressure detecting unit configured to detect a work implement pump pressure of the work implement pump; a work implement operating member for operating the work implement; a work implement operation detecting unit configured to detect an operation amount of the work implement operating member; an accelerator operating member; and an accelerator operation detecting unit configured to detect an operation amount of the accelerator operating member; the power transmission device being configured so that a rotation speed ratio of the output shaft with respect to the input shaft is changed by changing the rotation speed of the motor, the method including:
a step of determining a work implement required power on the basis of an operation amount of the work implement operating member and the work implement pump pressure;
a step of determining a transmission required power on the basis of the vehicle speed and the operation amount of the accelerator operating member; and
a step of determining a transmission output ratio that is a value derived by dividing the driving power actually supplied from the engine to the power transmission device by the transmission required power, and a work implement output ratio that is a value derived by dividing the driving power actually supplied from the engine to the work implement pump by the work implement required power,
in a first case
in which the engine rotates at a rotation speed equal to or greater than a first rotation speed that is the rotation speed of the engine at a maximum matching point where an upper limit target input torque line and an engine torque line intersect and
in which the sum of the work implement required power and the transmission required power is greater than a first distributable power that a predetermined preferential distribution power subtracted from a load upper limit power of the engine at the first rotation speed leaves,
the step for determining the transmission output ratio and the work implement output ratio includes allocating the smaller of a transmission compensation power and the transmission required power to the power transmission device and distributing the remainder of the first distributable power to the work implement pump and to the power transmission device, thereby determining a first work implement allocation power allocated to the work implement pump and a first transmission allocation power allocated to the power transmission device.

* * * * *